US012367807B2

(12) United States Patent
Cong et al.

(10) Patent No.: US 12,367,807 B2
(45) Date of Patent: Jul. 22, 2025

(54) PIXEL CIRCUIT, DRIVING METHOD THEREFOR AND DISPLAY APPARATUS

(71) Applicants: Beijing BOE Display Technology Co., Ltd., Beijing (CN); BOE Technology Group Co., Ltd., Beijing (CN)

(72) Inventors: Ning Cong, Beijing (CN); Minghua Xuan, Beijing (CN); Can Zhang, Beijing (CN); Can Wang, Beijing (CN); Jinfei Niu, Beijing (CN); Jingjing Zhang, Beijing (CN); SeungWoo Han, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/027,494

(22) PCT Filed: Jun. 22, 2022

(86) PCT No.: PCT/CN2022/100510
§ 371 (c)(1),
(2) Date: Mar. 21, 2023

(87) PCT Pub. No.: WO2023/245508
PCT Pub. Date: Dec. 28, 2023

(65) Prior Publication Data
US 2024/0296782 A1 Sep. 5, 2024

(51) Int. Cl.
*G09G 3/32* (2016.01)

(52) U.S. Cl.
CPC ....... *G09G 3/32* (2013.01); *G09G 2300/0842* (2013.01); *G09G 2300/0861* (2013.01); *G09G 2310/08* (2013.01)

(58) Field of Classification Search
CPC ............ G09G 3/32; G09G 2300/0842; G09G 2300/0861; G09G 2310/08; G09G 3/3233
See application file for complete search history.

(56) References Cited

U.S. PATENT DOCUMENTS

2012/0019436 A1 1/2012 Yamashita
2019/0066599 A1 * 2/2019 Kim .................... H10K 59/124
(Continued)

FOREIGN PATENT DOCUMENTS

CN 110021262 A 7/2019
CN 110021264 A 7/2019
(Continued)

*Primary Examiner* — Amr A Awad
*Assistant Examiner* — Maheen I Javed
(74) *Attorney, Agent, or Firm* — IPro, PLLC

(57) ABSTRACT

Embodiments of the present disclosure provide a pixel circuit, a driving method therefor and a display apparatus. The pixel circuit includes: an input circuit, configured to input data signals loaded to a first data signal terminal into corresponding input nodes in response to signals loaded to $2^N-1$ first scanning signal terminals; a control circuit, configured to control signals of $2^N$ control nodes respectively in response to signals of at least two input nodes in the $2^N-1$ input nodes; an output circuit, configured to provide a signal of an $m^{th}$ selection control signal terminal in $2^N$ selection control signal terminals to an output node in response to a signal of an $m^{th}$ control node in the $2^N$ control nodes; and a light-emitting drive circuit, configured to drive a to-be-driven device to work in response to a signal of the output node.

19 Claims, 10 Drawing Sheets

(56) References Cited

U.S. PATENT DOCUMENTS

| | | | | |
|---|---|---|---|---|
| 2020/0027516 | A1* | 1/2020 | Feng | G09G 3/3291 |
| 2021/0335212 | A1* | 10/2021 | Cong | G09G 3/32 |
| 2021/0366347 | A1 | 11/2021 | Xuan et al. | |
| 2021/0407376 | A1* | 12/2021 | Yue | G09G 3/3233 |

FOREIGN PATENT DOCUMENTS

| | | | | |
|---|---|---|---|---|
| CN | 111433839 | A | 7/2020 | |
| CN | 113781951 | A | 12/2021 | |
| WO | WO-2020007122 | A1 * | 1/2020 | G09G 3/32 |
| WO | WO-2020048075 | A1 * | 3/2020 | G09G 3/2007 |
| WO | 2022076926 | A1 | 4/2022 | |

* cited by examiner

| Vda1 | Vda2 | Vda3 |
|---|---|---|
| 0 | 0 | 0 |
| 0 | 0 | 1 |
| 1 | 0 | 0 |
| 1 | 1 | 0 |

| Vda1 | Vda2 | Vda3 |
|---|---|---|
| 0 | - | 0 |
| 0 | - | 1 |
| 1 | 0 | - |
| 1 | 1 | - |

PIXEL CIRCUIT, DRIVING METHOD THEREFOR AND DISPLAY APPARATUS

The present application is a National Stage of International Application No. PCT/CN2022/100510, filed on Jun. 22, 2022, which is hereby incorporated by reference in its entirety.

FIELD

The present disclosure relates to the technical field of display, in particular to a pixel circuit, a driving method therefor and a display apparatus.

BACKGROUND

With the development of a micro light emitting diode technology, a mini light emitting diode (Mini LED) (a size of which is about in a range of 100-300 μm) and a micro light emitting diode (Micro LED) (a size of which is below 100 μm) have the characteristics of being high in light emitting efficiency, brightness, resolution and response speed and the like, thereby being widely applied to display apparatuses.

SUMMARY

A pixel circuit provided by an embodiment of the present disclosure includes: an input circuit, coupled with a first data signal terminal, $2^N-1$ first scanning signal terminals and $2^N-1$ input nodes respectively, wherein the $2^N-1$ first scanning signal terminals are in one-to-one correspondence with the $2^N-1$ input nodes, the input circuit is configured to input data signals loaded to the first data signal terminal into the corresponding input nodes in response to signals loaded to the $2^N-1$ first scanning signal terminals, and N is an integer greater than 1; a control circuit, coupled with the $2^N-1$ input nodes respectively, wherein the control circuit is configured to control signals of $2^N$ control nodes respectively in response to signals of at least two input nodes in the $2^N-1$ input nodes; an output circuit, coupled with the $2^N-1$ control nodes, $2^N$ selection control signal terminals and an output node respectively, wherein the $2^N$ control nodes are in one-to-one correspondence with the $2^N$ selection control signal terminals, the output circuit is configured to provide a signal of an $m^{th}$ selection control signal terminal in the $2^N$ selection control signal terminals to the output node in response to a signal of an $m^{th}$ control node in the $2^N$ control nodes, $1 \leq m \leq 2^N$, and m is an integer; and a light-emitting drive circuit, coupled with the output node and a to-be-driven device respectively, wherein the light-emitting drive circuit is configured to drive the to-be-driven device to work in response to a signal of the output node.

In some possible implementations, the input circuit includes: $2^N-1$ input sub-circuits, wherein a $k^{th}$ input sub-circuit in the $2^N-1$ input sub-circuits is coupled with a $k^{th}$ first scanning signal terminal in the $2^N-1$ first scanning signal terminals and a $k^{th}$ input node in the $2^N-1$ input nodes respectively; and the $k^{th}$ input sub-circuit is configured to input a data signal loaded to the first data signal terminal into a $k^{th}$ input node in response to a signal loaded to the $k^{th}$ first scanning signal terminal; and $1 \leq k \leq 2^N-1$, and k is an integer.

In some possible implementations, the $k^{th}$ input sub-circuit includes a $k^{th}$ first transistor; and a control terminal of the $k^{th}$ first transistor is coupled with the $k^{th}$ first scanning signal terminal, a first terminal of the $k^{th}$ first transistor is coupled with the first data signal terminal, and a second terminal of the $k^{th}$ first transistor is coupled with the $k^{th}$ input node.

In some possible implementations, the control circuit includes: $2^N-1$ control sub-circuits, and input terminals of the $2^N-1$ control sub-circuits are coupled with the $2^N-1$ input nodes in a one-to-one correspondence; the $2^N-1$ control sub-circuits are defined as a first-stage control sub-circuit to an $N^{th}$-stage control sub-circuit; wherein each $N^{th}$-stage control sub-circuit is in one-to-one correspondence with two control nodes in the $2^N$ control nodes, an input terminal of the $N^{th}$-stage control sub-circuit is coupled with one control node in the corresponding two control nodes, and an output terminal of the $N^{th}$-stage control sub-circuit is coupled with the other control node in the corresponding two control nodes; and each $(q-1)^{th}$-stage control sub-circuit corresponds to two $q^{th}$-stage control sub-circuits, a control terminal of one $q^{th}$-stage control sub-circuit in the two $q^{th}$-stage control sub-circuits is coupled with an output terminal of the corresponding $(q-1)^{th}$-stage control sub-circuit, and a control terminal of the other $q^{th}$-stage control sub-circuit in the two $q^{th}$-stage control sub-circuits is coupled with an input terminal of the corresponding $(q-1)^{th}$-stage control sub-circuit; and the $q^{th}$-stage control sub-circuits are configured to provide signals of input terminals to output terminals thereof in response to signals loaded to the control terminals thereof; and $2 \leq q \leq N$, and q is an integer.

In some possible implementations, the first-stage control sub-circuit includes a first latch; and an input terminal of the first latch serves as an input terminal of the first-stage control sub-circuit, and an output terminal of the first latch serves as an output terminal of the first-stage control sub-circuit.

In some possible implementations, the first latch includes: a first phase inverter and a second phase inverter; an input terminal of the first phase inverter serves as the input terminal of the first latch, and an output terminal of the first phase inverter serves as the output terminal of the first latch; and an input terminal of the second phase inverter is coupled with the output terminal of the first phase inverter, and an output terminal of the second phase inverter is coupled with the input terminal of the first phase inverter.

In some possible implementations, each $q^{th}$-stage control sub-circuit includes: a second latch; and a control terminal of the second latch serves as a control terminal of the $q^{th}$-stage control sub-circuit, an input terminal of the second latch serves as the input terminal of the $q^{th}$-stage control sub-circuit, and an output terminal of the second latch serves as an output terminal of the $q^{th}$-stage control sub-circuit.

In some possible implementations, the second latch includes: a first tri-state gate and a second tri-state gate; a control terminal of the first tri-state gate serves as the control terminal of the second latch, an input terminal of the first tri-state gate serves as the input terminal of the second latch, and an output terminal of the first tri-state gate serves as the output terminal of the second latch; and a control terminal of the second tri-state gate is coupled with the control terminal of the first tri-state gate, an input terminal of the second tri-state gate is coupled with the output terminal of the first tri-state gate, and an output terminal of the second tri-state gate is coupled with the input terminal of the first tri-state gate.

In some possible implementations, the output circuit includes: $2^N$ output sub-circuits; an $m^{th}$ output sub-circuit in the $2^N$ output sub-circuits is coupled with the $m^{th}$ control node, the $m^{th}$ selection control signal terminal and the output node; and the $m^{th}$ output sub-circuit is configured to provide the signal of the $m^{th}$ selection control signal terminal to the output node in response to the signal of the $m^{th}$ control node.

In some possible implementations, the $m^{th}$ output sub-circuit includes an $m^{th}$ second transistor; a control terminal of the $m^{th}$ second transistor is coupled with the $m^{th}$ control node, a first terminal of the $m^{th}$ second transistor is coupled with the $m^{th}$ selection control signal terminal, and a second terminal of the $m^{th}$ second transistor is coupled with the output node.

In some possible implementations, the light-emitting drive circuit includes: a light-emitting control sub-circuit; and the light-emitting control sub-circuit is coupled with the output node, a light-emitting control signal terminal and the to-be-driven device respectively; and the light-emitting control sub-circuit is configured to drive the to-be-driven device to work in response to signals of the light-emitting control signal terminal and the output node.

In some possible implementations, the light-emitting control sub-circuit includes a third transistor; a control terminal of the third transistor is coupled with the light-emitting control signal terminal, a first terminal of the third transistor is coupled with the output node, and a second terminal of the third transistor is coupled with a first terminal of the to-be-driven device; and a second terminal of the to-be-driven device is coupled with a first reference power terminal.

In some possible implementations, the light-emitting control sub-circuit is further coupled with a second scanning signal terminal, a second data signal terminal and a reset signal terminal; and the light-emitting control sub-circuit is configured to drive the to-be-driven device to work in response to a signal of the light-emitting control signal terminal, a signal of the output node, a signal loaded to the second scanning signal terminal, a data signal loaded to the second data signal terminal and a signal loaded to the reset signal terminal.

In some possible implementations, the light-emitting control sub-circuit includes: a fourth transistor, a fifth transistor, a sixth transistor, a seventh transistor, a storage capacitor and a drive transistor; a control terminal of the fourth transistor is coupled with the light-emitting control signal terminal, a first terminal of the fourth transistor is coupled with the output node, and a second terminal of the fourth transistor is coupled with a control terminal of the fifth transistor; a first terminal of the fifth transistor is coupled with a second terminal of the drive transistor, and a second terminal of the fifth transistor is coupled with the first terminal of the to-be-driven device; a control terminal of the sixth transistor is coupled with the second scanning signal terminal, a first terminal of the sixth transistor is coupled with the reset signal terminal, and a second terminal of the sixth transistor is coupled with the second terminal of the drive transistor; a control terminal of the seventh transistor is coupled with the second scanning signal terminal, a first terminal of the seventh transistor is coupled with the second data signal terminal, and a second terminal of the seventh transistor is coupled with a control terminal of the drive transistor; a first terminal of the drive transistor is coupled with a second reference power terminal; and the second terminal of the to-be-driven device is coupled with the first reference power terminal.

A display apparatus provided by an embodiment of the present disclosure includes a plurality of above pixel circuits.

A driving method for a pixel circuit provided by an embodiment of the present disclosure is used for driving the above pixel circuit and includes: loading a signal of an active level to a first scanning signal terminal in $2^N-1$ first scanning signal terminals, loading a signal of an inactive level to other first scanning signal terminals in $2^N-1$ first scanning signal terminals, and inputting a data signal loaded to a first data signal terminal into an input node of the corresponding first scanning signal terminal loaded with the active level; controlling, by the control circuit, the signals of the $2^N$ control nodes respectively in response to the signals of the at least two input nodes in the $2^N-1$ input nodes; providing, by the output circuit, the signal of the $m^{th}$ selection control signal terminal in the $2^N$ selection control signal terminals to the output node in response to the signal of the $m^{th}$ control node in the $2^N$ control nodes; and driving, by the light-emitting drive circuit, the to-be-driven device to work in response to the signal of the output node.

In some possible implementations, in the $2^N$ selection control signal terminals, respective voltage amplitudes of signals loaded to the respective selection control signal terminals are different.

In some possible implementations, in the $2^N$ selection control signal terminals, respective duty radios of the signals loaded to the selection control signal terminals are different.

In some possible implementations, the signal loaded to each selection control signal terminal of the $2^N$ selection control signal terminals is a direct current voltage signal or a pulse width modulation signal.

DETAILED DESCRIPTION OF THE EMBODIMENTS

In order to make objectives, technical solutions and advantages of the embodiments of the present disclosure clearer, the technical solutions of the embodiments of the present disclosure will be described clearly and fully below with reference to the accompanying drawings of the embodiments of the present disclosure. Apparently, the described embodiments are some, but not all of the embodiments of the present disclosure. The embodiments in the present disclosure and features in the embodiments may be mutually combined without conflicts, Based on the described embodiments of the present disclosure, all other embodiments obtained by those ordinarily skilled in the art without creative work fall within the protection scope of the present disclosure.

Unless otherwise defined, technical or scientific terms used in the present disclosure should be understood commonly by those ordinarily skilled in the art to which the present disclosure pertains. “First”, “second” and similar words used in the present disclosure do not represent any sequence, quantity or significance but are only used for distinguishing different components. “Include” or “contain” or similar words mean that an element or an item preceding such word covers elements or items listed after the word and their equivalents without excluding other elements or items. “Connection” or “connected” and similar words may include an electrical connection, direct or indirect, instead of being limited to a physical or mechanical connection.

It needs to be noted that sizes and shapes of all figures in the accompanying drawings do not reflect a true scale and are only intended to illustrate contents of the present disclosure, The same or similar reference numbers represent the same or similar elements or elements with the same or similar functions all the time.

Figure 1:
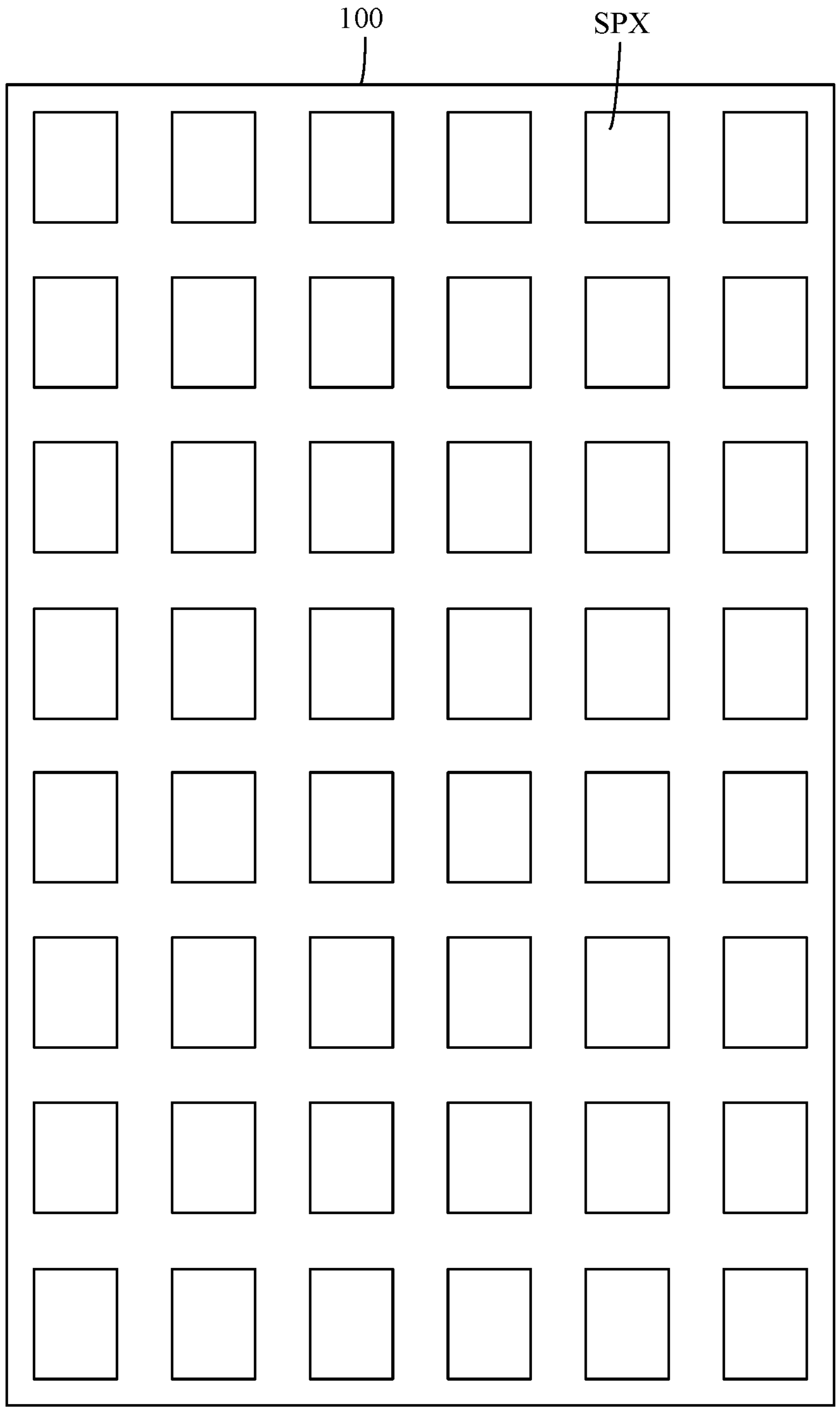
FIG. 1 is a schematic diagram of some structures of a display apparatus provided by an embodiment of the present disclosure.

As shown in FIG. 1, a display apparatus includes a plurality of pixel units, and the plurality of pixel units are distributed in an array. When a micro light emitting diode technology is applied to a display panel, at least one light-emitting device and a pixel circuit coupled with each light-emitting device are arranged in each pixel unit, and the pixel circuit is configured to provide a voltage for the light-emitting device coupled therewith so as to control the light-emitting device to emit light, and thus image display is implemented. For example, one light-emitting device and the pixel circuit coupled with the light-emitting device are arranged in each pixel unit. However, a structure of a pixel circuit in a light-emitting device display panel in the related art is complicated.

Figure 2:
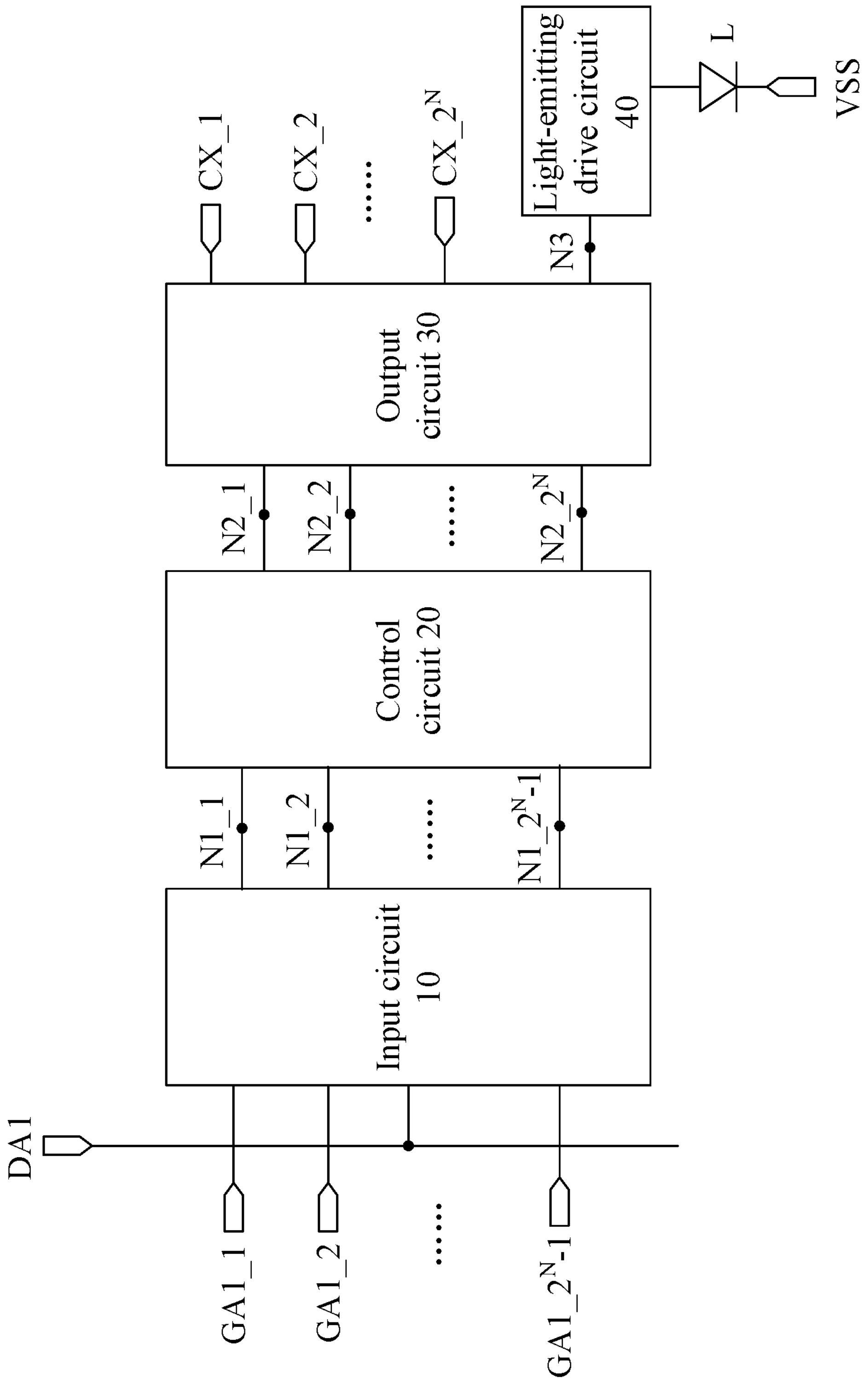
FIG. 2 is a schematic diagram of some structures of a pixel circuit provided by an embodiment of the present disclosure.

As shown in FIG. 2, a pixel circuit provided by an embodiment of the present disclosure includes: an input circuit 10, a control circuit 20, an output circuit 30 and a light-emitting drive circuit 40. The input circuit 10 is coupled with a first data signal terminal DA1, $2^N-1$ first scanning signal terminals (such as GA1_1, GA1_2, . . . GA1_$2^N-1$) and $2^N-1$ input nodes (such as N1_1, N1_2, . . . N1_$2^N-1$) respectively. The control circuit 20 is coupled with the $2^N-1$ input nodes (such as N1_1, N1_2, . . . , N1_$2^N-1$) respectively. The output circuit 30 is coupled with $2^N$ control nodes (such as N2_1, N2_2, . . . , N2_$2^N$), $2^N$ selection control signal terminals (such as CX_1, CX_2, . . . CX_$2^N$) and an output node N3 respectively. The light-emitting drive circuit 40 is coupled with the output node N3 and a to-be-driven device respectively. Besides, the $2^N-1$ first scanning signal terminals (such as GA1_1, GA1_2, . . . GA1_$2^N-1$) are in one-to-one correspondence with the $2^N-1$ input nodes (such as N1_1, N1_2, . . . N1_$2^N-1$), and the $2^N$ control nodes (such as N2_1, N2_2, . . . N2_$2^N$) are in one-to-one correspondence with the $2^N$ selection control signal terminals (such as CX_1, CX_2, . . . CX_$2^N$). The input circuit 10 is configured to input data signals loaded to the first data signal terminal DA1 into the corresponding input nodes (such as N1_1, N1_2, . . . N1_$2^N-1$) in response to signals loaded to the $2^N-1$ first scanning signal terminals (such as GA1_1, GA1_2, . . . GA1_$2^N-1$). The control circuit 20 is configured to control signals of $2^N$ control nodes (such as N2_1, N2_2, . . . N2_$2^N$) respectively in response to signals of at least two input nodes in the $2^N-1$ input nodes (such as N1_1, N1_2, . . . N1_$2^N-1$). The output circuit 30 is configured to provide a signal of an $m^{th}$ selection control signal terminal CX_m in the $2^N$ selection control signal terminals (such as CX_1, CX_2, . . . CX_$2^N$) to the output node N3 in response to a signal of an $m^{th}$ control node N2_*m* in the $2^N$ control nodes (such as N2_1, N2_2, . . . N2_$2^N$). The light-emitting drive circuit 40 is configured to drive the to-be-driven device to work in response to the signal of the output node N3. N is an integer greater than 1. $1 \leq m \leq 2^N$, and m is an integer.

According to the above pixel circuit provided by the embodiment of the present disclosure, the input circuit may input the data signals loaded to the first data signal terminal into the corresponding input nodes in response to the signals loaded to the $2^N-1$ first scanning signal terminals. The control circuit may control the signals of the $2^N$ control nodes respectively in response to the signals of the at least two input nodes in the $2^N-1$ input nodes. The output circuit may provide the signal of the $m^{th}$ selection control signal terminal in the $2^N$ selection control signal terminals to the output node in response to the signal of the $m^{th}$ control node in the $2^N$ control nodes. The light-emitting drive circuit drives the to-be-driven device to work in response to the signal of the output node. Therefore, the input circuit, the control circuit, the output circuit and the light-emitting drive circuit may cooperate with one another, a plurality of inputs may be implemented on the pixel circuit, a signal of one selection control signal terminal may be selected by the pixel circuit from the plurality of different selection control signal terminals to be provided to the light-emitting drive circuit, and thus the light-emitting drive circuit may drive the to-be-driven device to work. Compared with the related art, a utilization ratio of devices in the pixel circuit is improved, and structural complexity of the pixel circuit is reduced.

When the pixel circuit provided by the embodiment of the present disclosure is applied to a display apparatus, the to-be-driven device may be a light-emitting device L. For example, the light-emitting device L may be at least one of a Micro LED or a Mini LED. The display apparatus may be suitable for an application scenario with fewer grey scales to be displayed. For example, the display apparatus may be a smartwatch. Certainly, in actual application, a specific implementation of the display apparatus may be determined according to demands of the actual application, which is not limited here.

For example, N=2, so m may be 1, 2, 3 or 4. Or N=3, so m may be 1, 2, 3, 4, 5, 6, 7 or 8. Certainly, N=4, 5, 6 or more, which is not limited here.

Figure 3:
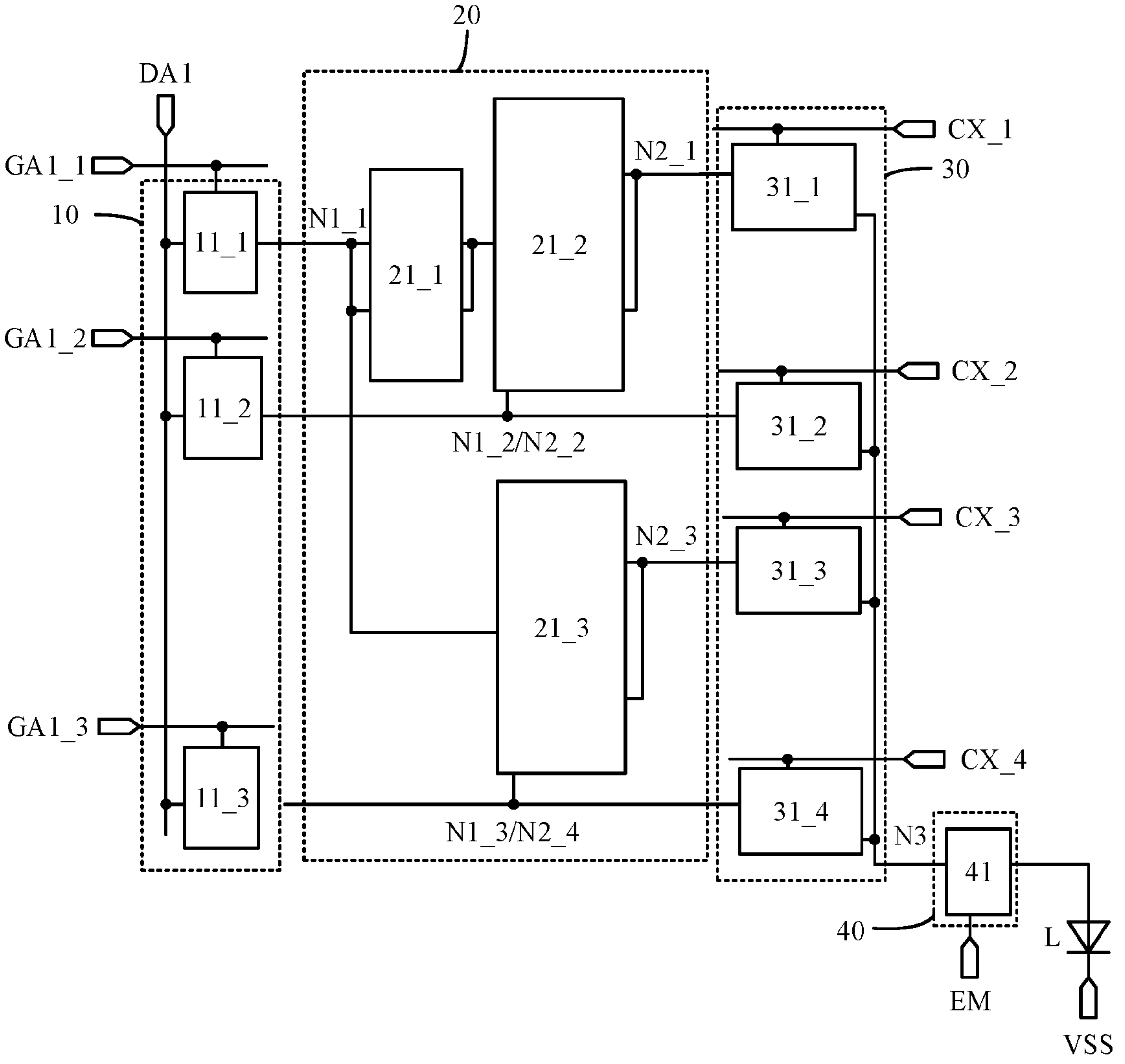
FIG. 3 is a schematic diagram of some other structures of a pixel circuit provided by an embodiment of the present disclosure.

In some embodiments of the present disclosure, the input circuit includes: $2^N-1$ input sub-circuits, wherein a $k^{th}$ input sub-circuit in the $2^N-1$ input sub-circuits is coupled with a $k^{th}$ first scanning signal terminal in the $2^N-1$ first scanning signal terminals and a $k^{th}$ input node in the $2^N-1$ input nodes respectively; the $k^{th}$ input sub-circuit is configured to input a $k^{th}$ data signal loaded to the first data signal terminal into a $k^{th}$ input node in response to a signal loaded to the $k^{th}$ first scanning signal terminal; and $1 \leq k \leq 2^N-1$, and k is an integer. For example, as shown in FIG. 3, taking N=2 as an example, k may be 1, 2 and 3. In other words, the input circuit 10 includes three input sub-circuits, and there are three first scanning signal terminals and three input nodes. The three input sub-circuits are respectively: a first input sub-circuit 11_1, a second input sub-circuit 11_2 and a third input sub-circuit 11_3. The three first scanning signal terminals are respectively: a first first scanning signal terminal GA_1, a second first scanning signal terminal GA_2 and a third first scanning signal terminal GA_3. The three input nodes are respectively: a first input node N1_1, a second input node N1_2 and a third input node N1_3.

Figure 4:
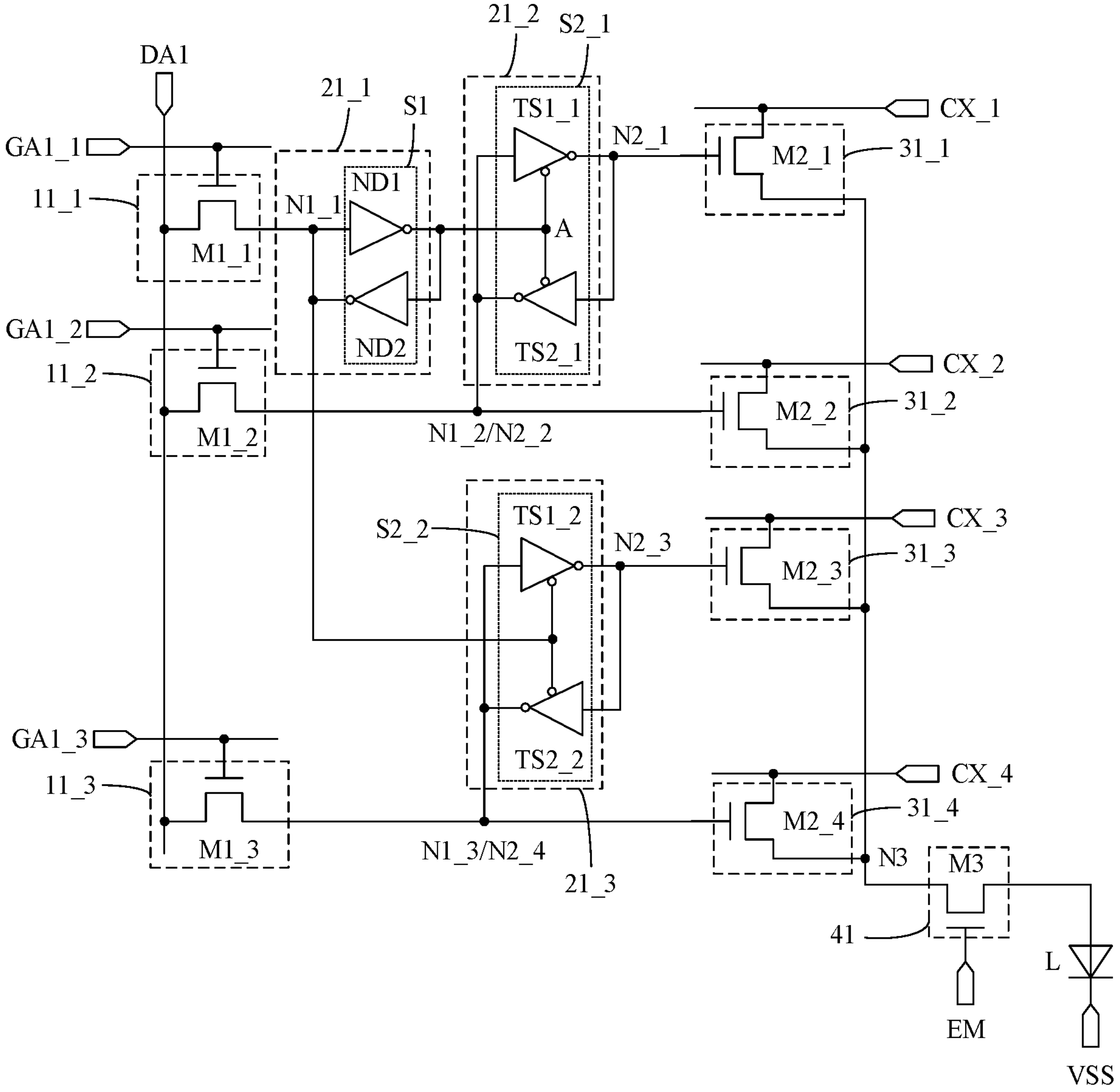
FIG. 4 is a schematic diagram of some specific structures of a pixel circuit provided by an embodiment of the present disclosure.

In some examples of the present disclosure, as shown in FIG. 3, the first input sub-circuit 11_1 is coupled with the first first scanning signal terminal GA_1 and the first input node N1_1, and the first input sub-circuit 11_1 is configured to input the data signal loaded to the first data signal terminal DA1 into the first input node N1_1 in response to the signal loaded to the first first scanning signal terminal GA_1. For example, as shown in FIG. 4, the first input sub-circuit 11_1 includes a first first transistor M1_1. A control terminal of the first first transistor M1_1 is coupled with the first first scanning signal terminal GA_1, a first terminal of the first first transistor M1_1 is coupled with the first data signal terminal DA1, and a second terminal of the first first transistor M1_1 is coupled with the first input node N1_1. Optionally, the first first transistor M1_1 is turned on when the signal loaded to the first first scanning signal terminal GA_1 is an active level and turned off when the signal loaded to the first first scanning signal terminal GA_1 is an inactive level. For example, the first first transistor M1_1 is an N-type transistor, so the active level of the signal loaded to the first first scanning signal terminal GA_1 is a high level, and the inactive level of the signal loaded to the first first scanning signal terminal GA_1 is a low level. Or, the first first transistor M1_1 is a P-type transistor, so the active level of the signal loaded to the first first scanning signal terminal GA_1 is a low level, and the inactive level of the signal loaded to the first first scanning signal terminal GA_1 is a high level.

In some examples of the present disclosure, as shown in FIG. 3, the second input sub-circuit 11_2 is coupled with the second first scanning signal terminal GA_2 and the second input node N1_2, and the second input sub-circuit 11_2 is configured to input the data signal loaded to the first data signal terminal DA1 into the second input node N1_2 in response to a signal loaded to the second first scanning signal terminal GA_2. For example, as shown in FIG. 4, the second input sub-circuit 11_2 includes a second first transistor M1_2. A control terminal of the second first transistor M1_2 is coupled with the second first scanning signal terminal GA_2, a first terminal of the second first transistor M1_2 is coupled with the first data signal terminal DA1, and a second terminal of the second first transistor M1_2 is coupled with the second input node N1_2. Optionally, the second first transistor M1_2 is turned on when the signal loaded to the second first scanning signal terminal GA_2 is an active level and turned off when the signal loaded to the second first scanning signal terminal GA_2 is an inactive level. For example, the second first transistor M1_2 is an N-type transistor, so the active level of the signal loaded to the second first scanning signal terminal GA_2 is a high level, and the inactive level of the signal loaded to the second first scanning signal terminal GA_2 is a low level. Or, the second first transistor M1_2 is a P-type transistor, so the active level of the signal loaded to the second first scanning signal terminal GA_2 is a low level, and the inactive level of the signal loaded to the second first scanning signal terminal GA_2 is a high level.

In some examples of the present disclosure, as shown in FIG. 3, the third input sub-circuit 11_3 is coupled with the third first scanning signal terminal GA_3 and the third input node N1_3, and the third input sub-circuit 11_3 is configured to input the data signal loaded to the first data signal terminal DA1 into the third input node N1_3 in response to a signal loaded to the third first scanning signal terminal GA_3. For example, as shown in FIG. 4, the third input sub-circuit 11_3 includes a third first transistor M1_3. A control terminal of the third first transistor M1_3 is coupled with the third first scanning signal terminal GA_3, a first terminal of the third first transistor M1_3 is coupled with the first data signal terminal DA1, and a second terminal of the third first transistor M1_3 is coupled with the third input node N1_3. Optionally, the third first transistor M1_3 is turned on when the signal loaded to the third first scanning signal terminal GA_3 is an active level and turned off when the signal loaded to the third first scanning signal terminal GA_3 is an inactive level. For example, the third first transistor M1_3 is an N-type transistor, so the active level of the signal loaded to the third first scanning signal terminal GA_3 is a high level, and the inactive level of the signal loaded to the third first scanning signal terminal GA_3 is a low level. Or, the third first transistor M1_3 is a P-type transistor, so the active level of the signal loaded to the third first scanning signal terminal GA_3 is a low level, and the inactive level of the signal loaded to the third first scanning signal terminal GA_3 is a high level.

In some embodiments of the present disclosure, the control circuit 20 includes: $2^N-1$ control sub-circuits, and input terminals of the $2^N-1$ control sub-circuits are coupled with the $2^N-1$ input nodes in a one-to-one correspondence; the $1^N-1$ control sub-circuits are defined as a first-stage control sub-circuit to an $N^{th}$-stage control sub-circuit; wherein each $N^{th}$-stage control sub-circuit is in one-to-one correspondence with two control nodes in the $2^N$ control nodes, an input terminal of the $N^{th}$-stage control sub-circuit is coupled with one control node in the corresponding two control nodes, and an output terminal of the $N^{th}$-stage control sub-circuit is coupled with the other control node in the corresponding two control nodes; each $(q-1)^{th}$-stage control sub-circuit corresponds to two $q^{th}$-stage control sub-circuits, a control terminal of one $q^{th}$-stage control sub-circuit in the two $q^{th}$-stage control sub-circuits is coupled with an output terminal of the corresponding $(q-1)^{th}$-stage control sub-circuit, and a control terminal of the other $q^{th}$-stage control sub-circuit in the two $q^{th}$-stage control sub-circuits is coupled with an input terminal of the corresponding $(q-1)^{th}$-stage control sub-circuit; the $q^{th}$-stage control sub-circuits are configured to provide signals of input terminals to output terminals thereof in response to signals loaded to the control terminals thereof; and $2 \le q \le N$, and q is an integer. For example, as shown in FIG. 3, taking N=2 as an example, q is 2. The control circuit 20 includes three control sub-circuits, and there are four control nodes. The three control sub-circuits are respectively: a first control sub-circuit 21_1, a second control sub-circuit 21_2 and a third control sub-circuit 21_3. The first control sub-circuit 21_1 is defined as the first-stage control sub-circuit, the second control sub-circuit 21_2 and the third control sub-circuit 21_3 are defined as the second-stage control sub-circuits, that is, the first control sub-circuit 21_1 corresponds to the second control sub-circuit 21_2 and the third control sub-circuit 21_3, and a control terminal of the third control sub-circuit 21_3 is coupled with an input terminal of the first control sub-circuit 21_1. The second control sub-circuit 21_2 and the third control sub-circuit 21_3 are configured to provide signals of input terminals to output terminals thereof in response to signals loaded to the control terminals thereof and perform latching on the input signals. Besides, the four control nodes are respectively: a first control node N2_1, a second control node N2_2, a third control node N2_3 and a fourth control node N2_4. The second control sub-circuit 21_2 corresponds to the first control node N2_1 and the second control node N2_2, and the third control sub-circuit 21_3 corresponds to the third control node N2_3 and the fourth control node N2_4.

In some examples of the present disclosure, as shown in FIG. 3, an input terminal of the first control sub-circuit 21_1 is coupled with the first input node N1_1. The first control sub-circuit 21_1 is configured to perform phase inverting on the signal input into its input terminal and then provide the inverted signal to its output terminal and perform latching on the input signal. For example, as shown in FIG. 4, the first-stage control sub-circuit is the first control sub-circuit, including a first latch S1. An input terminal of the first latch S1 serves as the input terminal of the first-stage control sub-circuit, and an output terminal of the first latch S1 serves as an output terminal of the first-stage control sub-circuit. Optionally, the first latch S1 includes: a first phase inverter ND1 and a second phase inverter ND2. An input terminal of the first phase inverter ND1 serves as the input terminal of the first latch S1, and an output terminal of the first phase inverter ND1 serves as the output terminal of the first latch S1. An input terminal of the second phase inverter ND2 is coupled with the output terminal of the first phase inverter ND1, and an output terminal of the second phase inverter ND2 is coupled with the input terminal of the first phase inverter ND1.

In some examples of the present disclosure, as shown in FIG. 3, the control terminal of the second control sub-circuit 21_2 is coupled with the output terminal of the first control sub-circuit 21-1, the input terminal of the second control sub-circuit 21_2 is coupled with the second input node N1_2, the output terminal of the second control sub-circuit 21_2 is coupled with the first control node N2_1, and the input terminal of the second control sub-circuit 21_2 is coupled with the second control node N2_2. For example, as shown in FIG. 4, the second control sub-circuit 21_2 includes: a second latch S2_1. A control terminal of the second latch S2_1 serves as the control terminal of the second control sub-circuit 21_2, an input terminal of the second latch S2_1 serves as the input terminal of the second control sub-circuit 21_2, and an output terminal of the second latch S2_1 serves as the output terminal of the second control sub-circuit 21_2. Optionally, when the control terminal of the second latch S2_1 is provided with an active level, a signal input into its input terminal may be subjected to phase inverting and then the inverted signal may be output to its output terminal, and the input signal is latched. When the control terminal of the second latch S2_1 is provided with an inactive level, its input terminal is disconnected from its output terminal. For example, the active level of the control terminal of the second latch S2_1 may be a low level, and the inactive level of the control terminal of the second latch S2_1 may be a high level. Or, the active level of the control terminal of the second latch S2_1 may be a high level, and the inactive level of the control terminal of the second latch S2_1 may be a low level.

For example, as shown in FIG. 4, the second latch S2_1 in the second control sub-circuit 21_2 includes: a first tri-state gate TS1_1 and a second tri-state gate TS2_1. A control terminal of the first tri-state gate TS1_1 serves as the control terminal of the second latch S2_1, an input terminal of the first tri-state gate TS1_1 serves as the input terminal of the second latch S2_1, and an output terminal of the first tri-state gate TS1_1 serves as the output terminal of the second latch S2_1. A control terminal of the second tri-state gate TS2_1 is coupled with the control terminal of the first tri-state gate TS1_1, an input terminal of the second tri-state gate TS2_1 is coupled with the output terminal of the first tri-state gate TS1_1, and an output terminal of the second tri-state gate TS2_1 is coupled with the input terminal of the first tri-state gate TS1_1. Optionally, when the control terminals of the first tri-state gate TS1_1 and the second tri-state gate TS2_1 are active levels, signals input into their input terminals may be subjected to phase inverting and then the inverted signals may be output to their output terminals, and the input signals are latched. For example, the active levels of the control terminals of the first tri-state gate TS1-1 and the second tri-state gate TS2_1 may be low levels, and inactive levels of the control terminals of the first tri-state gate TS1-1 and the second tri-state gate TS2_1 may be high levels. Or, the active levels of the control terminals of the first tri-state gate TS1-1 and the second tri-state gate TS2_1 may be high levels, and the inactive levels of the control terminals of the first tri-state gate TS1-1 and the second tri-state gate TS2_1 may be low levels.

In some examples of the present disclosure, as shown in FIG. 3, the control terminal of the third control sub-circuit 21_3 is coupled with the input terminal of the first control sub-circuit 21_1, the input terminal of the third control sub-circuit 21_3 is coupled with the third input node N1_3, the output terminal of the third control sub-circuit 21_3 is coupled with the third control node N2_3, and the input terminal of the third control sub-circuit 21_3 is coupled with the fourth control node N2_4. For example, as shown in FIG. 4, the third control sub-circuit 21_3 includes: a second latch S2_2. A control terminal of the second latch S2_2 serves as the control terminal of the third control sub-circuit 21_3, an input terminal of the second latch S2_2 serves as the input terminal of the third control sub-circuit 21_3, and an output terminal of the second latch S2_2 serves as the output terminal of the third control sub-circuit 21_3. Optionally, when the control terminal of the second latch S2_2 is provided with an active level, a signal input into its input terminal may be subjected to phase inverting and then the inverted signal may be output to its output terminal, and the input signal is latched. When the control terminal of the second latch S2_2 is provided with an inactive level, its input terminal is disconnected from its output terminal. For example, the active level of the control terminal of the second latch S2_2 may be a low level, and an inactive level of the control terminal of the second latch S2_2 may be a high level. Or, the active level of the control terminal of the second latch S2_2 may be a high level, and the inactive level of the control terminal of the second latch S2_2 may be a low level.

For example, as shown in FIG. 4, the second latch S2_2 in the third control sub-circuit 21_3 includes: a first tri-state gate TS1_2 and a second tri-state gate TS2_2. A control terminal of the first tri-state gate TS1_2 serves as the control terminal of the second latch S2_2, an input terminal of the first tri-state gate TS1_2 serves as the input terminal of the second latch S2_2, and an output terminal of the first tri-state gate TS1_2 serves as the output terminal of the second latch S2_2. A control terminal of the second tri-state gate TS2_2 is coupled with the control terminal of the first tri-state gate TS1_2, an input terminal of the second tri-state gate TS2_2 is coupled with the output terminal of the first tri-state gate TS2_1, and an output terminal of the second tri-state gate TS2_2 is coupled with the input terminal of the first tri-state gate TS1_2. Optionally, when the control terminals of the first tri-state gate TS1_2 and the second tri-state gate TS2_2 are active levels, signals input into their input terminals may be subjected to phase inverting and then the inverted signals may be output to their output terminals, and the input signals are latched. For example, the active levels of the control terminals of the first tri-state gate TS1_2 and the second tri-state gate TS2_2 may be low levels, and inactive levels of the first tri-state gate TS1_2 and the second tri-state gate TS2_2 may be high levels. Or, the active levels of the control terminals of the first tri-state gate TS1_2 and the second tri-state gate TS2_2 may be high levels, and the inactive levels of the control terminals of the first tri-state gate TS1_2 and the second tri-state gate TS2_2 may be low levels.

In some embodiments of the present disclosure, the output circuit 30 includes: $2^N$ output sub-circuits; and an $m^{th}$ output sub-circuit in the $2^N$ output sub-circuits is coupled with the $m^{th}$ control node, the $m^{th}$ selection control signal terminal and the output node N3. The $m^{th}$ output sub-circuit is configured to provide the signal of the $m^{th}$ selection control signal terminal to the output node N3 in response to the signal of the $m^{th}$ control node. For example, as shown in FIG. 3, taking N=2 as an example, m is 1, 2, 3, and 4. In other words, the output circuit 30 includes four output sub-circuits. There are four selection control signal terminals. The four output sub-circuits are respectively: a first output sub-circuit 31_1, a second output sub-circuit 31_2, a third output sub-circuit 31_3 and a fourth output sub-circuit 31_4. The four selection control signal terminals are respectively: a first selection control signal terminal CX_1, a second selection control signal terminal CX_2, a third selection control signal terminal CX_3 and a fourth selection control signal terminal CX_4.

In some examples of the present disclosure, as shown in FIG. 3, the first output sub-circuit 31_1 is coupled with the first control node N2−1, the first selection control signal terminal CX_1 and the output node N3 respectively. Besides, the first output sub-circuit 31_1 is configured to provide a signal of the first selection control signal terminal CX_1 to the output node N3 in response to a signal of the first control node N2_1. For example, as shown in FIG. 4, the first output sub-circuit 31_1 includes a first second transistor M2_1. A control terminal of the first second transistor M2_1 is coupled with the first control node N2_1, a first terminal of the first second transistor M2_1 is coupled with the first selection control signal terminal CX_1, and a second terminal of the first second transistor M2_1 is coupled with the output node N3. Optionally, the first second transistor M2_1 is turned on when the signal of the first control node N2_1 is an active level and turned off when the signal of the first control node N2_1 is an inactive level. For example, the first second transistor M2_1 is an N-type transistor, so the active level of the signal of the first control node N2_1 is a high level, and the inactive level of the signal of the first control node N2_1 is a low level. Or, the first second transistor M2_1 is a P-type transistor, so the active level of the signal of the first control node N2_1 is a low level, and the inactive level of the signal of the first control node N2_1 is a high level.

In some examples of the present disclosure, as shown in FIG. 3, the second output sub-circuit 31_2 is coupled with the second control node N2_2, the second selection control signal terminal CX_2 and the output node N3 respectively. Besides, the second output sub-circuit 31_2 is configured to provide a signal of the second selection control signal terminal CX_2 to the output node N3 in response to a signal of the second control node N2_2. For example, as shown in FIG. 4, the second output sub-circuit 31_2 includes a second second transistor M2_2. A control terminal of the second second transistor M2_2 is coupled with the second control node N2_2, a first terminal of the second second transistor M2_2 is coupled with the second selection control signal terminal CX_2, and a second terminal of the second second transistor M2_2 is coupled with the output node N3. Optionally, the second second transistor M2_2 is turned on when the signal of the second control node N2_2 is an active level and turned off when the signal of the second control node N2_2 is an inactive level. For example, the second second transistor M2_2 is an N-type transistor, so the active level of the signal of the second control node N2_2 is a high level, and the inactive level of the signal of the second control node N2_2 is a low level. Or, the second second transistor M2_2 is a P-type transistor, so the active level of the signal of the second control node N2_2 is a low level, and the inactive level of the signal of the second control node N2_2 is a high level.

In some examples of the present disclosure, as shown in FIG. 3, the third output sub-circuit 31_3 is coupled with the third control node N2_3, the third selection control signal terminal CX_3 and the output node N3 respectively. Besides, the third output sub-circuit 31_3 is configured to provide a signal of the third selection control signal terminal CX_3 to the output node N3 in response to a signal of the third control node N2_3. For example, as shown in FIG. 4, the third output sub-circuit 31_3 includes a third second transistor M2_3. A control terminal of the third second transistor M2_3 is coupled with the third control node N2_3, a first terminal of the third second transistor M2_3 is coupled with the third selection control signal terminal CX_3, and a second terminal of the third second transistor M2_3 is coupled with the output node N3. Optionally, the third second transistor M2_3 is turned on when the signal of the third control node N2_3 is an active level and turned off when the signal of the third control node N2_3 is an inactive level. For example, the third second transistor M2_3 is an N-type transistor, so the active level of the signal of the third control node N2_3 is a high level, and the inactive level of the signal of the third control node N2_3 is a low level. Or, the third second transistor M2_3 is a P-type transistor, so the active level of the signal of the third control node N2_3 is a low level, and the inactive level of the signal of the third control node N2_3 is a high level.

It needs to be noted that a part of control nodes and a part of input nodes are shared. For example, as shown in FIG. 4, the second input node N1_2 and the second control node N2_2 are shared, that is, the second input node N1_2 and the second control node N2_2 are the same node. The third input node N1_3 and the fourth control node N2_4 are shared, that is, the third input node N1_3 and the fourth control node N2_4 are the same node.

In some embodiments of the present disclosure, as shown in FIG. 3, the light-emitting drive circuit 40 includes: a light-emitting control sub-circuit 41. The light-emitting control sub-circuit 41 is coupled with the output node N3, a light-emitting control signal terminal EM and the to-be-driven device respectively. The light-emitting control sub-circuit 41 is configured to drive the to-be-driven device to work in response to signals of the light-emitting control signal terminal EM and the output node N3. For example, as shown in FIG. 4, the light-emitting control sub-circuit 41 includes a third transistor M3. A control terminal of the third transistor M3 is coupled with the light-emitting control signal terminal EM, a first terminal of the third transistor M3 is coupled with the output node N3, a second terminal of the third transistor M3 is coupled with the first terminal of the to-be-driven device, and the second terminal of the to-be-driven device is coupled with a first reference power terminal VSS. Optionally, the third transistor M3 is turned on when the signal of the light-emitting control signal terminal EM is an active level and turned off when the signal of the light-emitting control signal terminal EM is an inactive level. For example, the third transistor M3 is an N-type transistor, so the active level of the signal of the light-emitting control signal terminal EM is a high level, and the inactive level of the signal of the light-emitting control signal terminal EM is a low level. Or, the third transistor M3 is a P-type transistor, so the active level of the signal of the light-emitting control signal terminal EM is a low level, and the inactive level of the signal of the light-emitting control signal terminal EM is a high level.

In the embodiment of the present disclosure, the control terminals of the above transistors may be their gates, the first terminals may be their source electrodes, and the second terminals may be their drain electrodes. Or, the control terminals of the above transistors may be their gates, the first terminals may be their drain electrodes, and the second terminals may be their source electrodes.

In the embodiment of the present disclosure, a voltage of the first reference power terminal may be 0 V or a negative value. Voltages of the selection control signal terminals are positive values. Besides, minimum voltages of the selection control signal terminals may be the same as the voltage of the first reference power terminal, or minimum voltages of the selection control signal terminals are higher than the voltage of the first reference power terminal and smaller than a sum of the voltage of the first reference power terminal and a light-emitting threshold voltage, or the minimum voltages of the selection control signal terminals are higher than the sum of the voltage of the first reference power terminal and the light-emitting threshold voltage. Light emitting is implemented when a voltage between the first terminal and the second terminal of the to-be-driven device is greater than the light-emitting threshold voltage.

For example, the to-be-driven device may be a light-emitting device L. A positive electrode of the light-emitting device L may be the first terminal of the to-be-driven device, and a negative electrode may be the second terminal of the to-be-driven device. For example, the light-emitting device L may be a Micro LED, so a positive electrode of the Micro LED is the first terminal of the to-be-driven device, and a negative electrode of the Micro LED is the second terminal of the to-be-driven device. The light-emitting device L may also be a Mini LED, so a positive electrode of the Mini LED is the first terminal of the to-be-driven device, and a negative electrode of the Mini LED is the second terminal of the to-be-driven device.

In the embodiment of the present disclosure, as the latches may store the signals statically, by arranging the first latch and the second latch, the function of each control sub-circuit is implemented, and an anti-interference capability of the signal transmitted in each control sub-circuit may be improved.

In the embodiment of the present disclosure, a storage capacitor CST and the drive transistor M0 do not need to be arranged, a corresponding preparation process of the storage capacitor CST is omitted, a mask for preparing the storage capacitor CST is omitted, thus cost may be reduced, and complexity of process flows is reduced. A problem of power consumption caused by charging and discharging of the storage capacitor CST may also be reduced.

In actual application, taking the Micro LED as an example, as for a glass-based Micro LED, due to a size limit of a thin film transistor (TFT), an area of the pixel circuit cannot be further reduced, and high-PPI display cannot be implemented. The pixel circuit in the embodiment of the present disclosure may be fabricated on a silicon-based substrate, and the Micro LED may be fabricated on other substrates (such as a wafer). Afterwards, the Micro LED on the other substrates is transferred onto the silicon-based substrate where the pixel circuit in the embodiment of the present application is fabricated, and the Micro LED is electrically connected with the pixel circuit in a binding mode. As the pixel circuit is fabricated on the silicon-based substrate, the area of the pixel circuit may be substantially reduced, thus more pixel circuits may be arranged on the silicon-based substrate with the same area, more Micro LEDs may be arranged, that is, more pixel units are arranged, and then PPI may be improved.

Figure 5:
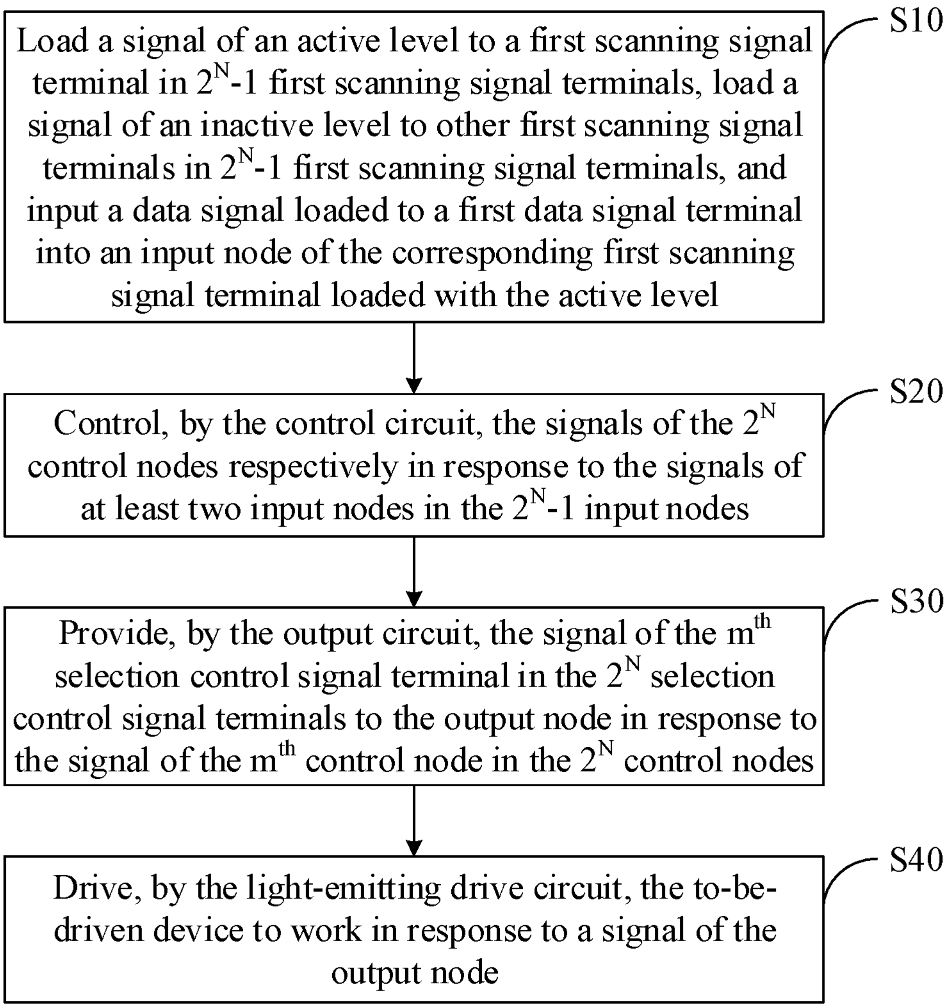
FIG. 5 is some flow charts of a driving method for a pixel circuit provided by an embodiment of the present disclosure.

An embodiment of the present disclosure provides a driving method for a pixel circuit, as shown in FIG. 5, including the following.

S10, a signal of an active level is loaded to a first scanning signal terminal in $2^N-1$ first scanning signal terminals, a signal of an inactive level is loaded to other first scanning signal terminals in $2^N-1$ first scanning signal terminals, and a data signal loaded to a first data signal terminal is input into an input node of the corresponding first scanning signal terminal loaded with the active level.

S20, the control circuit controls the signals of the $2^N$ control nodes respectively in response to the signals of the at least two input nodes in the $2^N-1$ input nodes.

S30, the output circuit provides the signal of the $m^{th}$ selection control signal terminal in the $2^N$ selection control signal terminals to the output node in response to the signal of the $m^{th}$ control node in the $2^N$ control nodes.

S40, the light-emitting drive circuit drives the to-be-driven device to work in response to the signal of the output node.

In some embodiments of the present disclosure, a selection control signal of each selection control signal terminal in the $2^N$ selection control signal terminals is different. As the respective signals of the respective selection control signal terminal are different, at any time point, by controlling a signal of one control node to be an active level and signals of the other control nodes to be an inactive level, levels of different control nodes at different time points may be controlled to be the active levels. Output sub-circuits are controlled through the control nodes with the active levels, the different selection control signals are provided to the light-emitting drive circuit, and thus pixel units implement multi-grey-scale display.

Figures 6, 7:
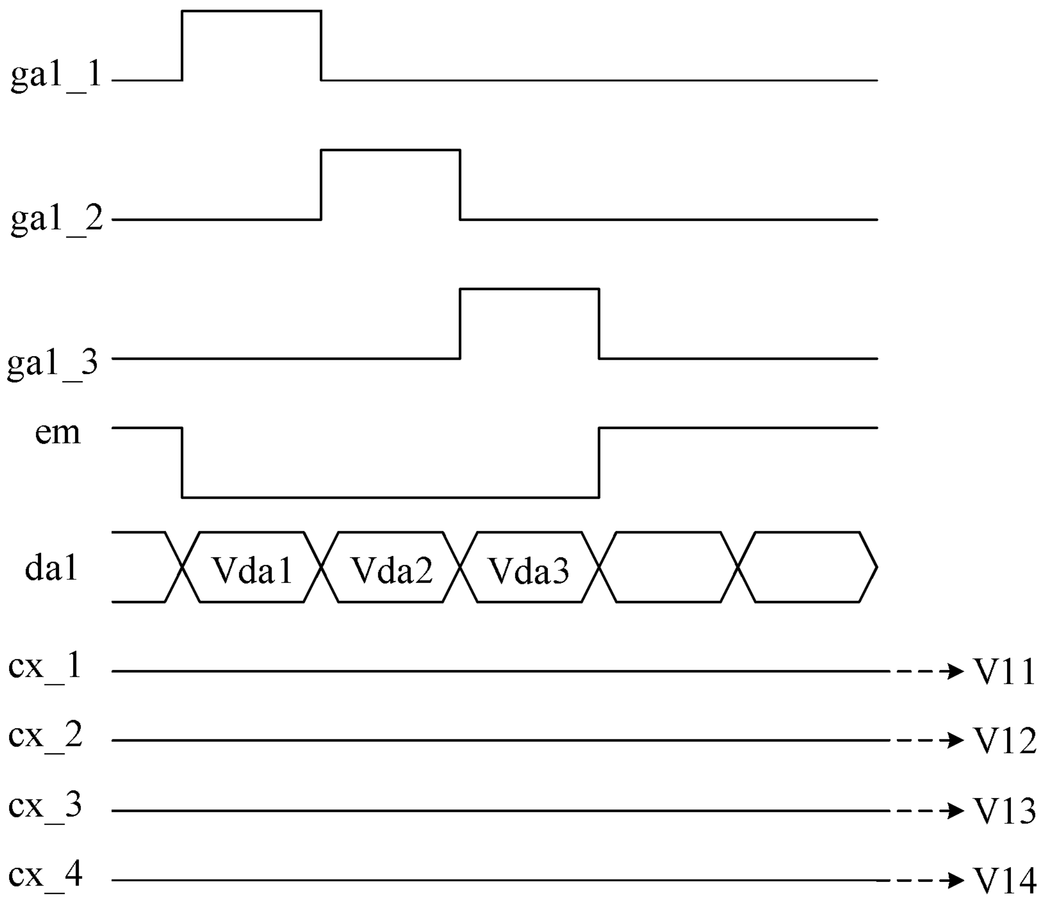
FIG. 6 is a diagram of some signal timings provided by an embodiment of the present disclosure.
FIG. 7 is a diagram of some levels provided by an embodiment of the present disclosure.

In some embodiments of the present disclosure, a signal loaded to each selection control signal terminal in the $2^N$ selection control signal terminals is a direct current voltage signal. For example, in the $2^N$ selection control signal terminals, voltage amplitudes of the signals loaded to the selection control signal terminals are different. Optionally, in the $2^N$ selection control signal terminals, the voltage amplitudes of the signals loaded to the selection control signal terminals are increased in sequence. For example, taking M=3 as an example, as shown in FIG. 6, a voltage amplitude of a selection control signal cx_1 of a first selection control signal terminal CX_1 is V11, a voltage amplitude of a selection control signal cx_2 of a second selection control signal terminal CX_2 is V12, a voltage amplitude of a selection control signal cx_3 of a third selection control signal terminal CX_3 is V13, a voltage amplitude of a selection control signal cx_4 of a fourth selection control signal terminal CX_4 is V14, and V11<V12<V13<V14. For example, V14 is 12 V, V13 is 8 V, V12 is 6 V and V11 is 4 V. Certainly, in the $2^N$ selection control signal terminals, the voltage amplitudes of the signals loaded to the selection control signal terminals may also be decreased in sequence.

For example, in the $2^N$ selection control signal terminals, duty radios of the signals loaded to the selection control signal terminals are different. When the signals loaded to the selection control signal terminals are direct current voltage signals, the duty radios refer to time durations of the signals of the selection control signal terminals when loading the corresponding voltage amplitudes to the selection control signal terminals in one display frame. Optionally, in the $2^N$ selection control signal terminals, the duty radios of the signals loaded to the selection control signal terminals are increased in sequence. In other words, the time durations of the signals of the selection control signal terminals when loading the corresponding voltage amplitudes to the selection control signal terminals are prolonged in sequence. For example, during loading of the voltage amplitude V11 of the selection control signal of the first selection control signal terminal, the corresponding time duration is W11. During loading of the voltage amplitude V12 of the selection control signal of the second selection control signal terminal, the corresponding time duration is W12. During loading of the voltage amplitude V13 of the selection control signal of the third selection control signal terminal, the corresponding time duration is W13. During loading of the voltage amplitude V14 of the selection control signal of the fourth selection control signal terminal, the corresponding time duration is W14. W11<W12<W13<W14. Or, in the $2^N$ selection control signal terminals, the voltage amplitudes of the signals loaded to the selection control signal terminals are decreased in sequence. In other words, the time durations of the signals of the selection control signal terminals when loading the corresponding voltage amplitudes to the selection control signal terminals are shortened in sequence. For example, during loading of the voltage amplitude V11 of the selection control signal of the first selection control signal terminal, the corresponding time duration is W21. During loading of the voltage amplitude V12 of the selection control signal of the second selection control signal terminal, the corresponding time duration is W22. During loading of the voltage amplitude V13 of the selection control signal of the third selection control signal terminal, the corresponding time duration is W23. During loading of the voltage amplitude V14 of the selection control signal of the fourth selection control signal terminal, the corresponding time duration is W24, W11>W12>W13>W14.

Certainly, in the $2^N$ selection control signal terminals, the duty radios of the signals loaded to the selection control signal terminals may also be the same. In other words, in one display frame, the time durations of the signals of the selection control signal terminals when loading the corresponding voltage amplitudes to the selection control signal terminals are the same.

Taking a structure of the pixel circuit shown in FIG. 4 as an example below, with reference to a signal timing diagram shown in FIG. 6 and a level schematic diagram shown in FIG. 7, a working process of the pixel circuit within one display frame provided by the embodiment of the present disclosure is described. The following description is made by taking the active levels of the above signals being high levels as an example.

In FIG. 6, ga1_1 represents the signal of the first first scanning signal terminal GA_1,ga1_2 represents the signal of the second first scanning signal terminal GA_2, ga1_3 represents the signal of the third first scanning signal terminal GA_3, em represents the signal of the light-emitting control signal terminal EM, da1 represents the signal of the first data signal terminal DA1, cx_1 represents the signal of the first selection control signal terminal CX_1, cx_2 represents the signal of the second selection control signal terminal CX_2, cx_3 represents the signal of the third selection control signal terminal CX_3, and cx_4 represents the signal of the fourth selection control signal terminal CX_4. Besides, the signals cx_1~ cx_4 are direct-current signals, a voltage amplitude of the signal cx_1 is V11, a voltage amplitude of the signal cx_2 is V12, a voltage amplitude of the signal cx_3 is V13, a voltage amplitude of the signal cx_4 is V14, and V11<V12<V13<V14.

In FIG. 7, "0" represents that any one of data signals Vda1~Vda3 is a low level, and "1" represents that any one of data signals Vda1~Vda3 is a high level.

In some examples, when the data signals Vda1~Vda3 are low levels, a voltage V13 of the signal cx_3 of the third selection control signal terminal CX_3 may be provided to the positive electrode of the light-emitting device L. A specific process is as follows: the signals ga1_1, ga1_2 and ga1_3 sequentially appears high-level signals, so the low-level Vda1~Vda3 are sequentially input into the first input node N1_1 to the third input node N1_3, and thus the signals of the first input node N1_1 to the third input node N1_3 are low levels. As the signal of the first input node N1_1 is the low level, under the action of the first latch S1, the data signal Vda1 may be latched, a signal of a node A is a high-level signal, the second latch S2_1 disconnects its input terminal from its output terminal, no signal is input into the first control node N2_1, and thus the first second transistor M2_1 is not turned on. The signal of the second input node N1_2 is a low level, the second input node N1_2 and the second control node N2_2 are shared, so the signal of the second control node N2_2 is a low level, and the second second transistor M2_2 is turned off. The signal of the third input node N1_3 is a low level, and the third input node N1_3 and the fourth control node N2_4 are shared, so the signal of the fourth control node N2_4 is a low level, and thus the fourth second transistor M2_4 is turned off. The signal of the first input node N1_1 is a low level, so the second latch S2_2 is turned on, the low-level signal of the third input node N1_3 is subjected to phase inverting and then the inverted signal may be output to the third control node N2_3, the level of the third control node N2_3 is a high level, and the third second transistor M2_3 is controlled to be turned on. The turned-on third second transistor M2_3 provides the signal cx_3 of the third selection control signal terminal CX_3 to the third transistor M3. When the signal em is a high level, the third transistor M3 is controlled to be turned on, so that the signal cx_3 of the third selection control signal terminal CX_3 is provided to the positive electrode of the light-emitting device L, and thus the voltage V13 is input into the positive electrode of the light-emitting device L to drive the light-emitting device L to emit light.

In some other examples, when the data signals Vda1~Vda2 are low levels, and the data signal Vda3 is a high level, the voltage V14 of the signal cx_4 of the fourth selection control signal terminal CX_4 may be provided to the positive electrode of the light-emitting device L. A specific process is as follows: the signals ga1_1, ga1_2 and ga1_3 sequentially appears high-level signals, so the low-level Vda1~Vda2 and the high-level Vda3 are input into the first input node N1_1 to the third input node N1_3 in sequence, thus the signals of the first input node N1_1 and the second input node N1_2 are low levels, and the signal of the third input node N1_3 is a high level. As the signal of the first input node N1_1 is the low level, under the action of the first latch S1, the data signal Vda1 may be latched, the signal of a node A is the high-level signal, the second latch S2_1 disconnects its input terminal from its output terminal, no signal is input into the first control node N2_1, and thus the first second transistor M2_1 is not turned on. The signal of the second input node N1_2 is the low level, the second input node N1_2 and the second control node N2_2 are shared, so the signal of the second control node N2_2 is the low level, and the second second transistor M2_2 is turned off. The signal of the first input node N1_1 is the low level, so the second latch S2_2 is turned on, the high-level signal of the third input node N1_3 is subjected to phase inverting and then the inverted signal may be output to the third control node N2_3, the level of the third control node N2_3 is a low level, and the third second transistor M2_3 is controlled to be turned off. The signal of the third input node N1_3 is the high level, and the third input node N1_3 and the fourth control node N2_4 are shared, so the signal of the fourth control node N2_4 is a high level, and thus the fourth second transistor M2_4 is turned on. The turned-on fourth second transistor M2_4 provides the signal cx_4 of the fourth selection control signal terminal CX_4 to the third transistor M3. When the signal em is the high level, the third transistor M3 is controlled to be turned on, so that the signal cx_4 of the fourth selection control signal terminal CX_4 is provided to the positive electrode of the light-emitting device L, and thus the voltage V14 is input into the positive electrode of the light-emitting device L to drive the light-emitting device L to emit light.

In other examples, when the data signals Vda2~Vda3 are low levels and the data signal Vda1 is the high level, the voltage V11 of the signal cx_1 of the first selection control signal terminal CX_1 may be provided to the positive electrode of the light-emitting device L. A specific process is as follows: the signals ga1_1, ga1_2 and ga1_3 sequentially appears high-level signals, so the high-level Vda1 and the low-level Vda2~Vda3 are input into the first input node N1_1 to the third input node N1_3 in sequence, thus the signal of the first input node N1_1 is a high level, and the signals of the second input node N1_2 and the third input node N1_3 are low levels. As the signal of the first input node N1_1 is the high level, under the action of the first latch S1, the data signal Vda1 may be latched, the signal of the node A is a low-level signal, the second latch S2_1 performs phase inverting on the low level of the second input node N1_2 and then provides the inverted level to the first control node N2_1, thus the signal of the first control node N2_1 is a high level, and the first second transistor M2_1 is controlled to be turned on. The turned-on first second transistor M2_1 provides the signal cx_1 of the first selection control signal terminal CX_1 to the third transistor M3. When the signal em is the high level, the third transistor M3 is controlled to be turned on, so that the signal cx_1 of the first selection control signal terminal CX_1 is provided to the positive electrode of the light-emitting device L, and thus the voltage V11 is input into the positive electrode of the light-emitting device L to drive the light-emitting device L to emit light. The signal of the second input node N1_2 is the low level, the second input node N1_2 and the second control node N2_2 are shared, so the signal of the second control node N2_2 is the low level, and the second second transistor M2_2 is turned off. The signal of the first input node N1_1 is the high level, so the second latch S2_2 disconnects its input terminal from its output terminal, no signal is input into the third control node N2_3, and thus the third second transistor M2_3 is not turned on. The signal of the third input node N1_3 is the low level, and the third input node N1_3 and the fourth control node N2_4 are shared, so the signal of the fourth control node N2_4 is the low level, and thus the fourth second transistor M2_4 is turned off.

In yet some examples, when the data signals Vda1~Vda2 are high levels, and the data signal Vda3 is the low level, the voltage V12 of the signal cx_2 of the second selection control signal terminal CX_2 may be provided to the positive electrode of the light-emitting device L. A specific process is as follows: the signals ga1_1, ga1_2 and ga1_3 sequentially appears high-level signals, so the high-level Vda1~Vda2 and the low-level Vda3 are input into the first input node N1_1 to the third input node N1_3 in sequence, thus the signals of the first input node N1_1 and the second input node N1_2 are high levels, and the signal of the third input node N1_3 is a low level. As the signal of the first input node N1_1 is the high level, under the action of the first latch S1, the data signal Vda1 may be latched, the signal of the node A is the low-level signal, the second latch S2_1 performs phase inverting on the high level of the second input node N1_2 and then provides the inverted level to the first control node N2_1, thus the signal of the first control node N2_1 is the low level, and the first second transistor M2_1 is controlled to be turned off. The signal of the second input node N1_2 is the high level, and the second input node N1_2 and the second control node N2_2 are shared, so the signal of the second control node N2_2 is the high level, and thus the second second transistor M2_2 is turned on. The turned-on second second transistor M2_2 provides the signal cx_2 of the second selection control signal terminal CX_2 to the third transistor M3. When the signal em is the high level, the third transistor M3 is controlled to be turned on, so that the signal cx_2 of the second selection control signal terminal CX_2 is provided to the positive electrode of the light-emitting device L, and thus the voltage V12 is input into the positive electrode of the light-emitting device L to drive the light-emitting device L to emit light. The signal of the first input node N1_1 is the high level, so the second latch S2_2 disconnects its input terminal from its output terminal, no signal is input into the third control node N2_3, and thus the third second transistor M2_3 is not turned on. The signal of the third input node N1_3 is the low level, and the third input node N1_3 and the fourth control node N2_4 are shared, so the signal of the fourth control node N2_4 is the low level, and thus the fourth second transistor M2_4 is turned off.

Taking the structure of the pixel circuit shown in FIG. 4 as an example below, with reference to the diagram of signal timings shown in FIG. 8A and FIG. 8B and the schematic diagram of levels shown in FIG. 9, the working process of the pixel circuit provided by the embodiment of the present disclosure within one display frame is described. The following description is made by taking the active levels of the above signals being the high levels as an example.

Figure 8A:
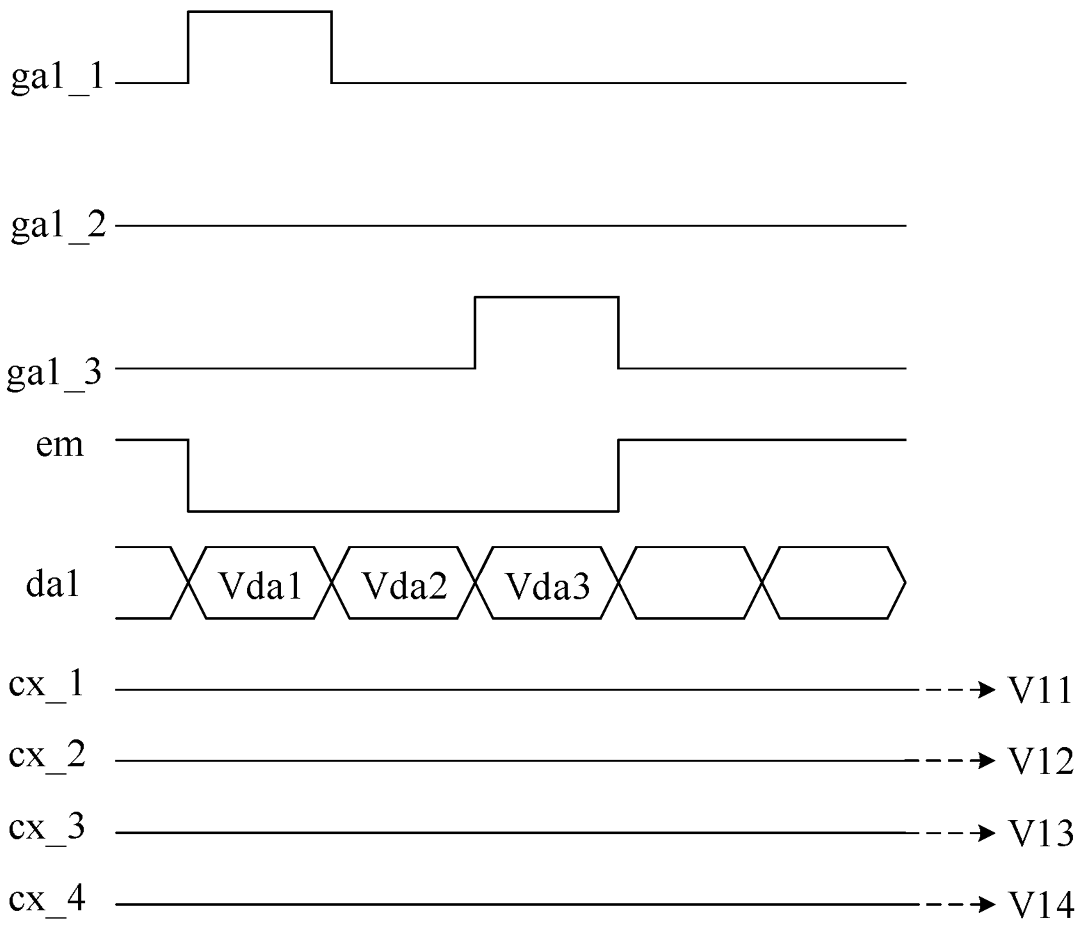
FIG. 8A is a diagram of some other signal timings provided by an embodiment of the present disclosure.
Figures 8B, 9:
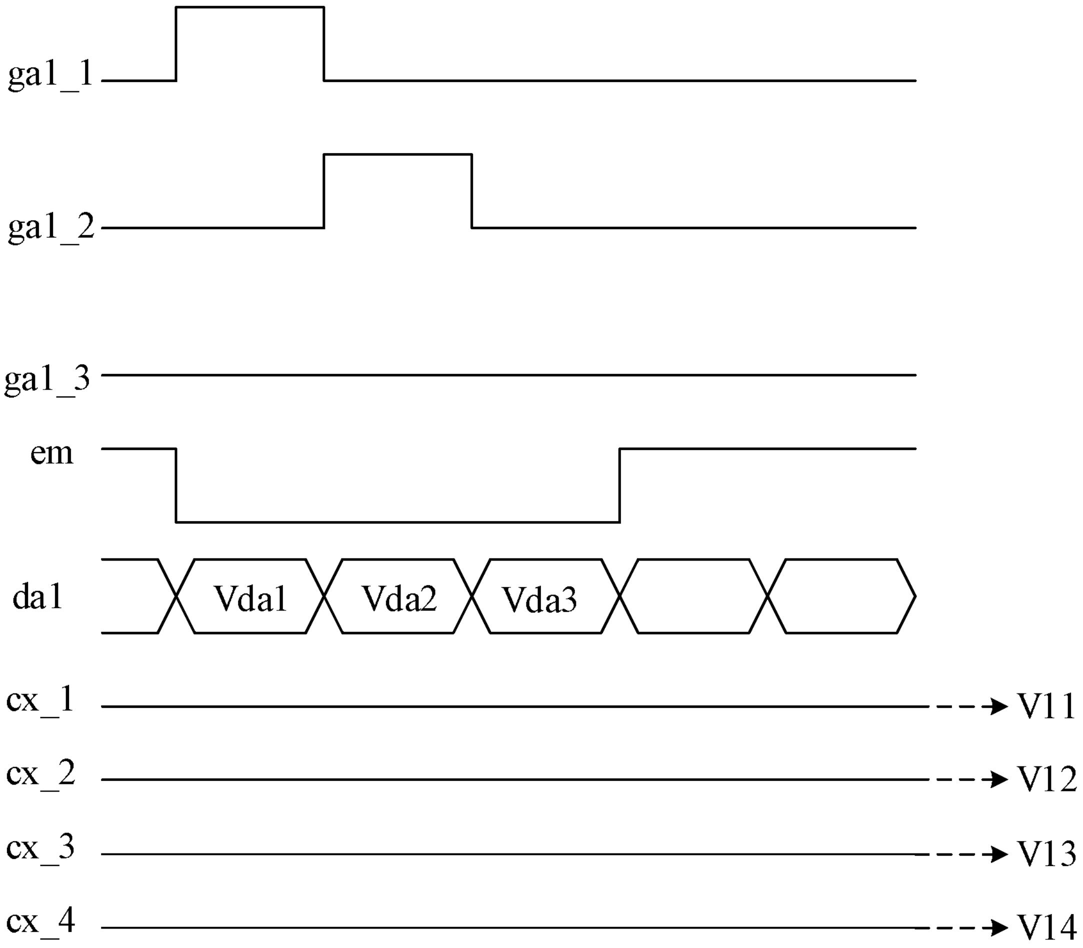
FIG. 8B is a diagram of yet some signal timings provided by an embodiment of the present disclosure.
FIG. 9 is a schematic diagram of some other levels provided by an embodiment of the present disclosure.

In FIG. 8A and FIG. 8B, ga1_1 represents the signal of the first first scanning signal terminal GA_1, ga1_2 represents the signal of the second first scanning signal terminal GA_2, ga1_3 represents the signal of the third first scanning signal terminal GA_3, em represents the signal of the light-emitting control signal terminal EM, da1 represents the signal of the first data signal terminal DA1, cx_1 represents the signal of the first selection control signal terminal CX_1, cx_2 represents the signal of the second selection control signal terminal CX_2, cx_3 represents the signal of the third selection control signal terminal CX_3, and cx_4 represents the signal of the fourth selection control signal terminal CX_4. Besides, the signals cx_1~cx_4 are direct-current signals, the voltage amplitude of the signal cx_1 is V11, the voltage amplitude of the signal cx_2 is V12, the voltage amplitude of the signal cx_3 is V13, the voltage amplitude of the signal cx_4 is V14, and V11<V12<V13<V14. With reference to FIG. 8A, the signal ga1_2 is the low level, so the second first transistor M1_2 is turned off. No signal is input into the second input node N1_2, so the second second transistor M2_2 is not turned on. With reference to FIG. 8B, the signal ga1_3 is the low level, so the third first transistor M1_3 is turned off. No signal is input into the third input node N1_3, so the fourth second transistor M2_4 is not turned on.

In FIG. 9, "0" represents that any one of the data signals Vda1~Vda3 is the low level, and "1" represents that any one of the data signals Vda1~Vda3 is the high level, "–" represents that no signal is input.

In some examples, with reference to FIG. 8A, when the data signals Vda1 and Vda3 are the low levels, and no signal of Vda2 is input, the voltage V13 of the signal cx_3 of the third selection control signal terminal CX_3 may be provided to the positive electrode of the light-emitting device L. A specific process is as follows: the signals ga1_1 and ga1_3 sequentially appears high-level signals, and the signal ga1_2 is the low level, so the low-level Vda1 and Vda3 are input into the first input node N1_1 and the third input node N1_3 in sequence, and thus the signals of the first input node N1_1 and the third input node N1_3 are the low levels. As the signal of the first input node N1_1 is the low level, under the action of the first latch S1, the data signal Vda1 may be latched, the signal of the node A is the high-level signal, the second latch S2_1 disconnects its input terminal from its output terminal, no signal is input into the first control node N2_1, and thus the first second transistor M2_1 is not turned on. The signal of the third input node N1_3 is the low level, and the third input node N1_3 and the fourth control node N2_4 are shared, so the signal of the fourth control node N2_4 is the low level, and thus the fourth second transistor M2_4 is turned off. The signal of the first input node N1_1 is the low level, so the second latch S2_2 is turned on. The low-level signal of the third input node N1_3 is subjected to phase inverting and then the inverted signal may be output to the third control node N2_3, so the level of the third control node N2_3 is the high level, and the third second transistor M2_3 is controlled to be turned on. The turned-on third second transistor M2_3 provides the signal cx_3 of the third selection control signal terminal CX_3 to the third transistor M3. When the signal em is the high level, the third transistor M3 is controlled to be turned on, so that the signal cx_3 of the third selection control signal terminal CX_3 is provided to the positive electrode of the light-emitting device L, and thus the voltage V13 is input into the positive electrode of the light-emitting device L to drive the light-emitting device L to emit light.

In some other examples, with reference to FIG. 8A, when the data signal Vda1 is the low level, the data signal Vda3 is the high level and the data signal Vda2 is not input, the voltage V14 of the signal cx_4 of the fourth selection control signal terminal CX_4 may be provided to the positive electrode of the light-emitting device L. A specific process is as follows: the signals ga1_1 and ga1_3 sequentially appears high-level signals, so the low-level Vda1 is input into the first input node N1_1, and the high-level Vda3 is input into the third input node N1_3, so that the signal of the first input node N1_1 is the low level, and the signal of the third input node N1_3 is the high level. As the signal of the first input node N1_1 is the low level, under the action of the first latch S1, the data signal Vda1 may be latched, the signal of the node A is the high-level signal, the second latch S2_1 disconnects its input terminal from its output terminal, no signal is input into the first control node N2_1, and thus the first second transistor M2_1 is not turned on. The signal of the first input node N1_1 is the low level, so the second latch S2_2 is turned on. The high-level signal of the third input node N1_3 is subjected to phase inverting and then the inverted signal may be output to the third control node N2_3, so the level of the third control node N2_3 is the low level, and the third second transistor M2_3 is controlled to be turned off. The signal of the third input node N1_3 is the high level and the third input node N1_3 and the fourth control node N2_4 are shared, so the signal of the fourth control node N2_4 is the high level, and thus the fourth second transistor M2_4 is turned on. The turned-on fourth second transistor M2_4 provides the signal cx_4 of the fourth selection control signal terminal CX_4 to the third transistor M3. When the signal em is the high level, the third transistor M3 is controlled to be turned on, so that the signal cx_4 of the fourth selection control signal terminal CX_4 is provided to the positive electrode of the light-emitting device L, and thus the voltage V14 is input into the positive electrode of the light-emitting device L to drive the light-emitting device L to emit light.

In other examples, with reference to FIG. 8B, when the data signal Vda1 is the high level, the data signal Vda2 is the low level and the data signal Vda3 is not input, the voltage V11 of the signal cx_1 of the first selection control signal terminal CX_1 may be provided to the positive electrode of the light-emitting device L. A specific process is as follows: the signals ga1_1 and ga1_3 sequentially appears high-level signals, so the high-level Vda1 and the low-level Vda2 are input into the first input node N1_1 and the second input node N1_2 in sequence, thus the signal of the first input node N1_1 is the high level, and the signal of the second input node N1_2 is the low level. As the signal of the first input node N1_1 is the high level, under the action of the first latch S1, the data signal Vda1 may be latched, the signal of the node A is the low-level signal, the second latch S2_1 performs phase inverting on the low level of the second input node N1_2 and then provides the inverted level to the first control node N2_1, and thus the signal of the first control node N2_1 is the high level, and the first second transistor M2_1 is controlled to be turned on. The turned-on first second transistor M2_1 provides the signal cx_1 of the first selection control signal terminal CX_1 to the third transistor M3. When the signal em is the high level, the third transistor M3 is controlled to be turned on, so that the signal cx_1 of the first selection control signal terminal CX_1 is provided to the positive electrode of the light-emitting device L, and thus the voltage V11 is input into the positive electrode of the light-emitting device L to drive the light-emitting device L to emit light. The signal of the second input node N1_2 is the low level, and the second input node N1_2 and the second control node N2_2 are shared, so the signal of the second control node N2_2 is the low level, and thus the second second transistor M2_2 is turned off. The signal of the first input node N1_1 is the high level, so the second latch S2_2 disconnects its input terminal from its output terminal, no signal is input into the third control node N2_3, and thus the third second transistor M2_3 is not turned on.

In yet some examples, with reference to FIG. 8B, when the data signals Vda1~Vda2 are the high levels, and the data signal Vda3 is not input, the voltage V12 of the signal cx_2 of the second selection control signal terminal CX_2 may be provided to the positive electrode of the light-emitting device L. A specific process is as follows: the signals ga1_1 and ga1_3 sequentially appears high-level signals, so the high-level Vda1~Vda2 are input into the first input node N1_1 and the second input node N1_2 in sequence, and thus the signals of the first input node N1_1 and the second input node N1_2 are the high levels. As the signal of the first input node N1_1 is the high level, under the action of the first latch S1, the data signal Vda1 may be latched, the signal of the node A is the low-level signal, the second latch S2_1 performs phase inverting on the high level of the second input node N1_2 and then provides the inverted level to the first control node N2_1, thus the signal of the first control node N2_1 is the low level, and the first second transistor M2_1 is controlled to be turned off. The signal of the second input node N1_2 is the high level, and the second input node N1_2 and the second control node N2_2 are shared, so the signal of the second control node N2_2 is the high level, and thus the second second transistor M2_2 is turned on. The turned-on second second transistor M2_2 provides the signal cx_2 of the second selection control signal terminal CX_2 to the third transistor M3. When the signal em is the high level, the third transistor M3 is controlled to be turned on, so that the signal cx_2 of the second selection control signal terminal CX_2 is provided to the positive electrode of the light-emitting device L, and thus the voltage V12 is input into the positive electrode of the light-emitting device L to drive the light-emitting device L to emit light. The signal of the first input node N1_1 is the high level, so the second latch S2_2 disconnects its input terminal from its output terminal, no signal is input into the third control node N2_3, and thus the third second transistor M2_3 is not turned on.

Figure 10:
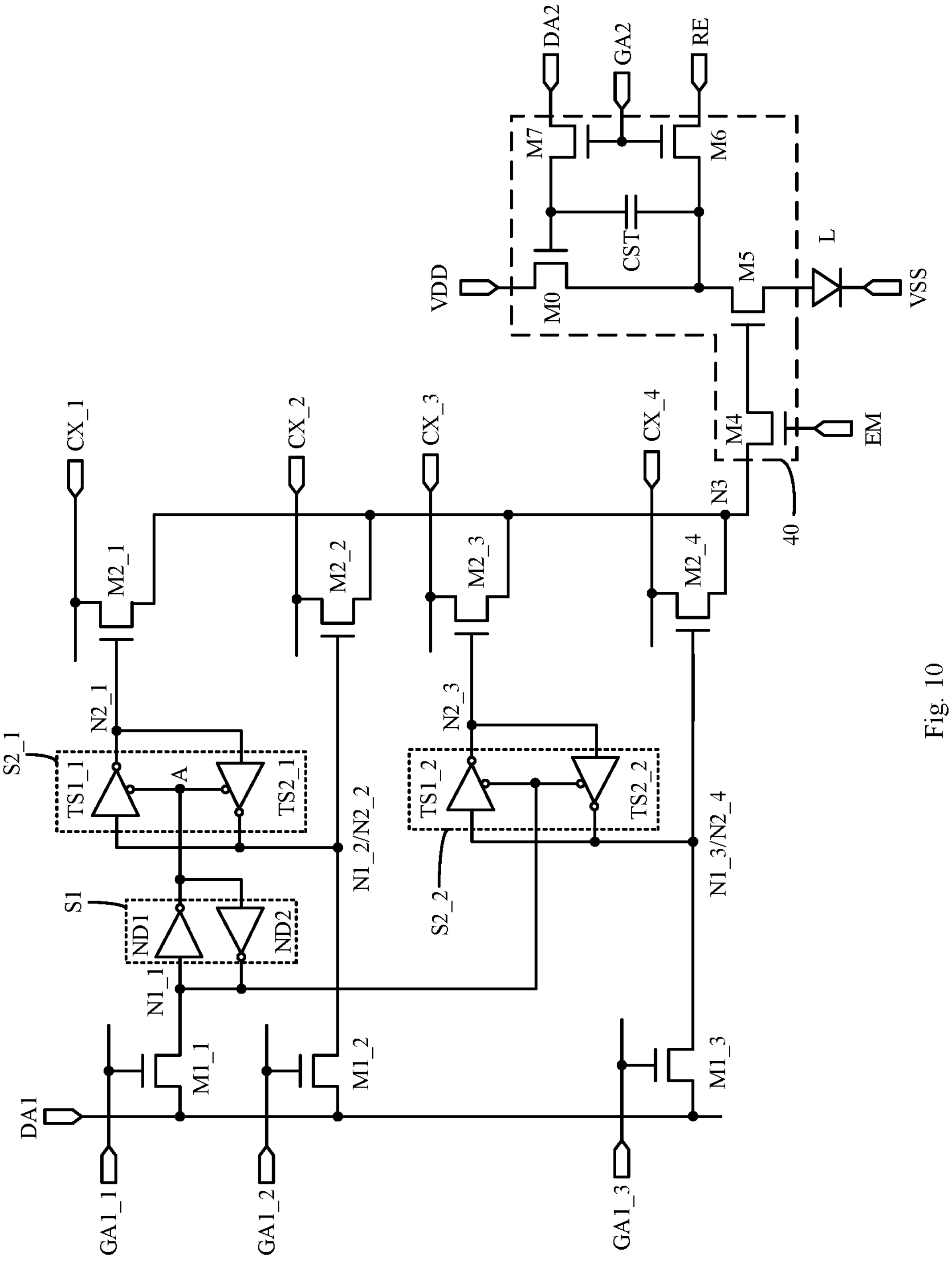
FIG. 10 is a schematic diagram of some other specific structures of a pixel circuit provided by an embodiment of the present disclosure.

An embodiment of the present disclosure provides a schematic diagram of some other structures of the pixel circuit, which refer to FIG. 10. A transformation is made specific to the implementation in the above embodiment. Only a difference between the embodiment and the above embodiment is described below: and the same parts between them are omitted here.

In the embodiment of the present disclosure, as shown in FIG. 10, the light-emitting control sub-circuit 41 is further coupled with a second scanning signal terminal GA2, a second data signal terminal DA2 and a reset signal terminal RE. The light-emitting control sub-circuit 41 is configured to drive the to-be-driven device to work in response to a signal of the light-emitting control signal terminal EM, a signal of the output node N3, a signal loaded to the second scanning signal terminal GA2, a data signal loaded to the second data signal terminal DA2 and a signal loaded to the reset signal terminal RE. For example, the light-emitting control sub-circuit 41 includes: a fourth transistor M4, a fifth transistor M5, a sixth transistor M6, a seventh transistor M7, a storage capacitor CST and a drive transistor M0; a control terminal of the fourth transistor M4 is coupled with the light-emitting control signal terminal EM, a first terminal of the fourth transistor M4 is coupled with the output node N3, and a second terminal of the fourth transistor M4 is coupled with a control terminal of the fifth transistor M5; a first terminal of the fifth transistor M5 is coupled with a second terminal of the drive transistor M0, and a second terminal of the fifth transistor M5 is coupled with the first terminal of the to-be-driven device (such as the light-emitting device L); a control terminal of the sixth transistor M6 is coupled with the second scanning signal terminal GA2, a first terminal of the sixth transistor M6 is coupled with the reset signal terminal RE, and a second terminal of the sixth transistor M6 is coupled with the second terminal of the drive transistor M0; a control terminal of the seventh transistor M7 is coupled with the second scanning signal terminal GA2, a first terminal of the seventh transistor M7 is coupled with the second data signal terminal DA2, and a second terminal of the seventh transistor M7 is coupled with a control terminal of the drive transistor M0; a first terminal of the drive transistor M0 is coupled with a second reference power terminal; and the second terminal of the to-be-driven device (the light-emitting device L) is coupled with the first reference power terminal VSS.

For example, the fourth transistor M4 is turned on when the signal of the light-emitting control signal terminal EM is an active level and turned off when the signal of the light-emitting control signal terminal EM is an inactive level. For example, the fourth transistor M4 is an N-type transistor, so the active level of the signal of the light-emitting control signal terminal EM is a high level, and the inactive level of the signal of the light-emitting control signal terminal EM is a low level. Or, the fourth transistor M4 is a P-type transistor, so the active level of the signal of the light-emitting control signal terminal EM is a low level, and the inactive level of the signal of the light-emitting control signal terminal EM is a high level.

For example, the fifth transistor M5 is turned on when the signal of its control terminal is an active level and turned off when the signal of its control terminal is an inactive level. For example, the fifth transistor M5 is an N-type transistor, so an active level of the signal of its control terminal is a high level, and an inactive level of the signal of its control terminal is a low level. Or, the fifth transistor M5 is a P-type transistor, so the active level of the signal of its control terminal is a low level, and the inactive level of the signal of its control terminal is a high level.

For example, the sixth transistor M6 is turned on when the signal of the second scanning signal terminal GA2 is an active level and turned off when the signal of the second scanning signal terminal GA2 is an inactive level. For example, the sixth transistor M6 is an N-type transistor, so the active level of the signal of the second scanning signal terminal GA2 is a high level, and an inactive level of the signal of the second scanning signal terminal GA2 is a low level. Or, the sixth transistor M6 is a P-type transistor, so the active level of the signal of the second scanning signal terminal GA2 is a low level, and the inactive level of the signal of the second scanning signal terminal GA2 is a high level.

For example, the seventh transistor M7 is turned on when the signal of the second scanning signal terminal GA2 is an active level and turned off when the signal of the second scanning signal terminal is an inactive level. For example, the seventh transistor M7 is an N-type transistor, so the active level of the signal of the second scanning signal terminal GA2 is a high level, and the inactive level of the signal of the second scanning signal terminal GA2 is a low level. Or, the seventh transistor M7 is a P-type transistor, so an active level of the signal of the second scanning signal terminal GA2 is a low level, and the inactive level of the signal of the second scanning signal terminal GA2 is a high level.

For example, a voltage of the second reference power terminal is a positive value. The drive transistor M0 may generate a drive current, and the drive current, after being input into the light-emitting device L, may drive the light-emitting device L to emit light.

In some embodiments of the present disclosure, the signal loaded to each selection control signal terminal in the $2^N$ selection control signal terminals is a pulse width modulation signal.

Figure 11:
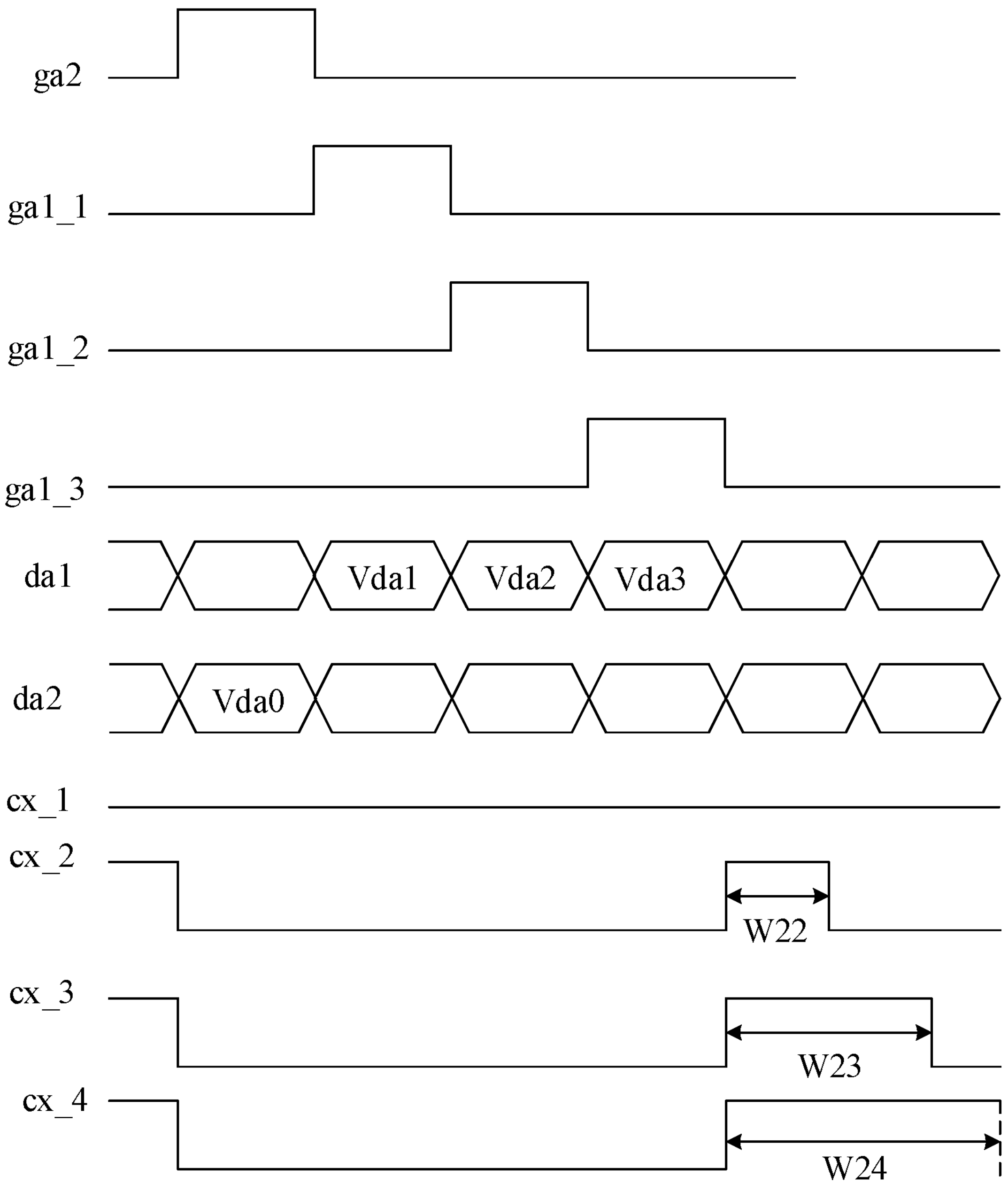
FIG. 11 is a diagram of yet some signal timings provided by an embodiment of the present disclosure.

For example, in the $2^N$ selection control signal terminals, duty radios of the signals loaded to the selection control signal terminals are different. The duty radios refer to time durations of the selection control signal terminals when loading the active levels to the selection control signal terminals in one display frame. Optionally, in the $2^N$ selection control signal terminals, the duty radios of the signals loaded to the selection control signal terminals are increased in sequence. In other words, the time durations of the selection control signal terminals when loading the active levels to the selection control signal terminals are prolonged in sequence. For example, as shown in FIG. 11, the time duration corresponding to the active level of the selection control signal cx_1 of the first selection control signal terminal CX_1 is 0. The time duration corresponding to the active level of the selection control signal cx_2 of the second selection control signal terminal CX_2 is W22. The time duration corresponding to the active level of the selection control signal cx_3 of the third selection control signal terminal CX_3 is W23. The time duration corresponding to the active level of the selection control signal cx_4 of the fourth selection control signal terminal CX_4 is W24. 0<W22<W23<W24. Or, in the $2^N$ selection control signal terminals, the duty radios of the signals loaded to the selection control signal terminals are decreased in sequence.

Taking the structure of the pixel circuit shown in FIG. 4 as an example below, with reference to a signal timing diagram shown in FIG. 11 and a level schematic diagram shown in FIG. 7, the working process of the pixel circuit provided by the embodiment of the present disclosure within one display frame is described. The following description is made by taking the active levels of the above signals being the high levels as an example.

In FIG. 11, ga2 represents the signal of the second scanning signal terminal GA2, ga1_1 represents the signal of the first first scanning signal terminal GA_1, ga1_2 represents the signal of the second first data signal terminal GA_2, ga1_3 represents the signal of the third first data signal terminal GA_3, em represents the signal of the light-emitting control signal terminal EM, da1 represents the signal of the first data signal terminal DA1, da2 represents the signal of the second data signal terminal DA2, cx_1 represents the signal of the first selection control signal terminal CX_1, cx_2 represents the signal of the second selection control signal terminal CX_2, cx_3 represents the signal of the third selection control signal terminal CX_3, and cx_4 represents the signal of the fourth selection control signal terminal CX_4.

In some examples, when the signal ga2 is the high level, the seventh transistor M7 is turned on, and a data signal Vda0 of the second data signal terminal DA2 is input into the control terminal of the drive transistor M0, so that a voltage of the control terminal of the drive transistor M0 is a voltage V03 of the data signal Vda0. Besides, the sixth transistor M6 is turned on, a reset signal of the reset signal terminal RE is input into the second terminal of the drive transistor M0, and the second terminal of the drive transistor M0 is reset. When the data signals Vda1~Vda3 are low levels, the signal cx_3 of the third selection control signal terminal CX_3 may be provided to the fourth transistor M4. When the signal em is the high level, the fourth transistor M4 is controlled to be turned on, so that the signal cx_3 of the third selection control signal terminal CX_3 is provided to the control terminal of the fifth transistor M5; and when the signal cx_3 is the high level, the fifth transistor M5 is controlled to be turned on, the drive transistor M0 may generate a drive current I_3 according to voltages of its control terminal and the second reference power terminal, and the drive current I_3 is input into the positive electrode of the light-emitting device L to drive the light-emitting device L to emit light.

In some other examples, when the signal ga_2 is the high level, the seventh transistor M7 is turned on, and the data signal Vda0 of the second data signal terminal DA2 is input into the control terminal of the drive transistor M0, so that the voltage of the control terminal of the drive transistor M0 is a voltage V04 of the data signal Vda0. Besides, the sixth transistor M6 is turned on, the reset signal of the reset signal terminal RE is input into the second terminal of the drive transistor M0, and the second terminal of the drive transistor M0 is reset. When the data signals Vda1~Vda2 are low levels, and the data signal Vda3 is the high level, the signal cx_4 of the fourth selection control signal terminal CX_4 may be provided to the fourth transistor M4. When the signal em is the high level, the fourth transistor M4 is controlled to be turned on, so that the signal cx_4 of the fourth selection control signal terminal CX_4 is provided to the control terminal of the fifth transistor M5; and when the signal cx_4 is the high level, the fifth transistor M5 is controlled to be turned on, the drive transistor M0 may generate a drive current I_4 according to voltages of its control terminal and the second reference power terminal, and the drive current I_4 is input into the positive electrode of the light-emitting device L to drive the light-emitting device L to emit light.

In other examples, when the signal ga2 is the high level, the seventh transistor M7 is turned on, and the data signal Vda0 of the second data signal terminal DA2 is input into the control terminal of the drive transistor M0, so that the voltage of the control terminal of the drive transistor M0 is the voltage V01 of the data signal Vda0. Besides, the sixth transistor M6 is turned on, the reset signal of the reset signal terminal RE is input into the second terminal of the drive transistor M0, and the second terminal of the drive transistor M0 is reset. When the data signals Vda2~Vda3 are the low levels, and the data signal Vda1 is the high level, the signal cx_1 of the first selection control signal terminal CX_1 may be provided to the fourth transistor M4. When the signal em is the high level, the fourth transistor M4 is controlled to be turned on, so that the signal cx_1 of the first selection control signal terminal CX_1 is provided to the control terminal of the fifth transistor M5; and a duty radio of the signal cx_1 is 0, so the signal cx_1 is the low level all the time, the fifth transistor M5 is controlled to be turned off, the drive transistor M0 may generate a drive current I_1 according to voltages of its control terminal and the second reference power terminal, the drive current I_1 cannot be input into the light-emitting device L, and the light-emitting device L is in a dark state.

In yet some examples, when the signal ga2 is the high level, the seventh transistor M7 is turned on, and the data signal Vda0 of the second data signal terminal DA2 is input into the control terminal of the drive transistor M0, so that voltage of the control terminal of the drive transistor M0 is a voltage V02 of the data signal Vda1. Besides, the sixth transistor M6 is turned on, the reset signal of the reset signal terminal RE is input into the second terminal of the drive transistor M0, and the second terminal of the drive transistor M0 is reset. When the data signals Vda1~Vda2 are the high levels, and the data signal Vda3 is the low level, the signal cx_2 of the second selection control signal terminal CX_2 may be provided to the fourth transistor M4. When the signal em is the high level, the fourth transistor M4 is controlled to be turned on, so that the signal cx_2 of the second selection control signal terminal CX_2 is provided to the control terminal of the fifth transistor M5; and when the signal cx_2 is the high level, the fifth transistor M5 is controlled to be turned on, the drive transistor M0 may generate a drive current I_2 according to voltages of its control terminal and the second reference power terminal, and the drive current I_2 is input into the light-emitting device L to drive the light-emitting device L to emit light.

It needs to be noted that according to an integral effect of human eye vision, the longer the light-emitting duration is, the higher the brightness sensed by human eyes is, by controlling the duty radios of the signals cx_1 to cx_4 of the first selection control signal terminal CX_1 to the fourth selection control signal terminal CX_4 to be different, a light-emitting duration of the light-emitting device L may be controlled, the human eyes sense different light-emitting brightnesses according to the light-emitting duration, and thus the pixel units implement display of $2^N$ grey scales. For example, when the voltages V01 to V04 of the Vda0 are the same, the light-emitting device L may be controlled to implement four different brightnesses by controlling the duty radios of the signals cx_1 to cx_4 of the first selection control signal terminal CX_1 to the fourth selection control signal terminal CX_4 to be different. Further, the voltages V01~V04 of the Vda1 may also be different, in this way, by controlling the drive currents I_1~I_4 to be different and controlling the duty radios of the signals cx_1~cx_4 of the first selection control signal terminal CX_1 to the fourth selection control signal terminal CX_4 to be different, the light-emitting device L is further controlled to implement a plurality of different brightnesses. Besides, when the signal cx_1 of the first selection control signal terminal CX_1 is output, the duty radio of the signal cx_1 of the first selection control signal terminal CX_1 is 0, at the moment, the light-emitting device L does not emit light and is in the dark state, so that a darker effect of the dark state of the light-emitting device L may be implemented. When the signal cx_4 of the fourth selection control signal terminal CX_4 is output, as the duty radio of the signal cx_4 of the fourth selection control signal terminal CX_4 is the largest, at the moment, the light-emitting device L is the brightest, and thus a brightness of a largest grey scale may be realized. Further, when any one of the signals cx_2~cx_4 of the second selection control signal terminal CX_2 to the fourth selection control signal terminal CX_4 is output, the voltages V02~V04 of the Vda0 may be controlled to be different, so the brightness of the light-emitting device L may be further subdivided, thus the light-emitting device L may implement display of more grey scales, and brightness uniformity of a low grey scale is effectively improved.

Though preferred embodiments of the present disclosure have been already described, those skilled in the art can make extra changes and modifications to these embodiments once they know a basic inventive concept. Therefore, the appended claims intend to be construed as including the preferred embodiments and all changes and modifications falling within the scope of the present disclosure.

Apparently, those skilled in the art may make various changes and variations to the embodiments of the present disclosure without departing from the spirit and scope of the embodiments of the present disclosure. In this way, if these modifications and variations of the embodiments of the present disclosure fall within the scope of the claims of the present disclosure and their equivalents, the present disclosure also intends to contain these modifications and variations.

What is claimed is:

1. A pixel circuit, comprising:

an input circuit, coupled with a first data signal terminal, $2^N-1$ first scanning signal terminals and $2^N-1$ input nodes respectively, wherein the $2^N-1$ first scanning signal terminals are in one-to-one correspondence with the $2^N-1$ input nodes, the input circuit is configured to input data signals loaded to the first data signal terminal into the corresponding input nodes in response to signals loaded to the $2^N-1$ first scanning signal terminals, and N is an integer greater than 1;

a control circuit, coupled with the $2^N-1$ input nodes respectively, wherein the control circuit is configured to control signals of $2^N$ control nodes respectively in response to signals of at least two input nodes in the $2^N-1$ input nodes;

an output circuit, coupled with the $2^N$ control nodes, $2^N$ selection control signal terminals and an output node respectively, wherein the $2^N$ control nodes are in one-to-one correspondence with the $2^N$ selection control signal terminals, the output circuit is configured to provide a signal of an $m^{th}$ selection control signal terminal in the $2^N$ selection control signal terminals to the output node in response to a signal of an $m^{th}$ control node in the $2^N$ control nodes, 1≤m≤2N, and m is an integer; and a light-emitting drive circuit, coupled with the output node and a to-be-driven device respectively, wherein the light-emitting drive circuit is configured to drive the to-be-driven device to work in response to a signal of the output node;

wherein the control circuit comprises: $2^N-1$ control sub-circuits, and input terminals of the $2^N-1$ control sub-circuits are coupled with the $2^N-1$ input nodes in a one-to-one correspondence;

the $2^N-1$ control sub-circuits are defined as a first-stage control sub-circuit to an $N^{th}$-stage control sub-circuit; wherein each $N^{th}$-stage control sub-circuit is in one-to-one correspondence with two control nodes in the $2^N$ control nodes, an input terminal of the $N^{th}$-stage control sub-circuit is coupled with one control node in the corresponding two control nodes, and an output terminal of the $N^{th}$-stage control sub-circuit is coupled with the other control node in the corresponding two control nodes;

each $(q-1)^{th}$-stage control sub-circuit corresponds to two $q^{th}$-stage control sub-circuits, a control terminal of one $q^{th}$-stage control sub-circuit in the two $q^{th}$-stage control sub-circuits is coupled with an output terminal of the corresponding $(q-1)^{th}$-stage control sub-circuit, and a control terminal of the other $q^{th}$-stage control sub-circuit in the two $q^{th}$-stage control sub-circuits is coupled with an input terminal of the corresponding $(q-1)^{th}$-stage control sub-circuit;

and the $q^{th}$-stage control sub-circuits are configured to provide signals of input terminals to output terminals thereof in response to signals loaded to the control terminals thereof; and 2≤q≤N, and q is an integer.

2. The pixel circuit according to claim 1, wherein the input circuit comprises: $2^N-1$ input sub-circuits, wherein a $k^{th}$ input sub-circuit in the $2^N-1$ input sub-circuits is coupled with a $k^{th}$ first scanning signal terminal in the $2^N-1$ first scanning signal terminals and a $k^{th}$ input node in the $2^N-1$ input nodes respectively;

the $k^{th}$ input sub-circuit is configured to input a data signal loaded to the first data signal terminal into the $k^{th}$ input node in response to a signal loaded to the $k^{th}$ first scanning signal terminal; and $1 \le k \le 2^N - 1$, and k is an integer.

3. The pixel circuit according to claim 2, wherein the $k^{th}$ input sub-circuit comprises a $k^{th}$ first transistor; and a control terminal of the $k^{th}$ first transistor is coupled with the $k^{th}$ first scanning signal terminal, a first terminal of the $k^{th}$ first transistor is coupled with the first data signal terminal, and a second terminal of the $k^{th}$ first transistor is coupled with the $k^{th}$ input node.

4. The pixel circuit according to claim 1, wherein the first-stage control sub-circuit comprises a first latch; and an input terminal of the first latch serves as an input terminal of the first-stage control sub-circuit, and an output terminal of the first latch serves as an output terminal of the first-stage control sub-circuit.

5. The pixel circuit according to claim 4, wherein the first latch comprises: a first phase inverter and a second phase inverter;

an input terminal of the first phase inverter serves as the input terminal of the first latch, and an output terminal of the first phase inverter serves as the output terminal of the first latch; and an input terminal of the second phase inverter is coupled with the output terminal of the first phase inverter, and an output terminal of the second phase inverter is coupled with the input terminal of the first phase inverter.

6. The pixel circuit according to claim 1, wherein the $q^{th}$-stage control sub-circuit comprises: a second latch; and a control terminal of the second latch serves as a control terminal of the $q^{th}$-stage control sub-circuit, an input terminal of the second latch serves as an input terminal of the $q^{th}$-stage control sub-circuit, and an output terminal of the second latch serves as an output terminal of the $q^{th}$-stage control sub-circuit.

7. The pixel circuit according to claim 6, wherein the second latch comprises: a first tri-state gate and a second tri-state gate;

a control terminal of the first tri-state gate serves as the control terminal of the second latch, an input terminal of the first tri-state gate serves as the input terminal of the second latch, and an output terminal of the first tri-state gate serves as the output terminal of the second latch; and a control terminal of the second tri-state gate is coupled with the control terminal of the first tri-state gate, an input terminal of the second tri-state gate is coupled with the output terminal of the first tri-state gate, and an output terminal of the second tri-state gate is coupled with the input terminal of the first tri-state gate.

8. The pixel circuit according to claim 1, wherein the output circuit comprises: $2^N$ output sub-circuits; an $m^{th}$ output sub-circuit in the $2^N$ output sub-circuits is coupled with the $m^{th}$ control node, the $m^{th}$ selection control signal terminal and the output node; and the $m^{th}$ output sub-circuit is configured to provide the signal of the $m^{th}$ selection control signal terminal to the output node in response to the signal of the $m^{th}$ control node.

9. The pixel circuit according to claim 8, wherein the $m^{th}$ output sub-circuit comprises an $m^{th}$ second transistor;

a control terminal of the $m^{th}$ second transistor is coupled with the $m^{th}$ control node, a first terminal of the $m^{th}$ second transistor is coupled with the $m^{th}$ selection control signal terminal, and a second terminal of the $m^{th}$ second transistor is coupled with the output node.

10. The pixel circuit according to claim 1, wherein the light-emitting drive circuit comprises: a light-emitting control sub-circuit;

the light-emitting control sub-circuit is coupled with the output node, a light-emitting control signal terminal and the to-be-driven device respectively; and the light-emitting control sub-circuit is configured to drive the to-be-driven device to work in response to signals of the light-emitting control signal terminal and the output node.

11. The pixel circuit according to claim 10, wherein the light-emitting control sub-circuit comprises a third transistor; and a control terminal of the third transistor is coupled with the light-emitting control signal terminal, a first terminal of the third transistor is coupled with the output node, and a second terminal of the third transistor is coupled with a first terminal of the to-be-driven device; and a second terminal of the to-be-driven device is coupled with a first reference power terminal.

12. The pixel circuit according to claim 11, wherein the light-emitting control sub-circuit is further coupled with a second scanning signal terminal, a second data signal terminal and a reset signal terminal; and the light-emitting control sub-circuit is configured to drive the to-be-driven device to work in response to a signal of the light-emitting control signal terminal, a signal of the output node, a signal loaded to the second scanning signal terminal, a data signal loaded to the second data signal terminal and a signal loaded to the reset signal terminal.

13. The pixel circuit according to claim 12, wherein the light-emitting control sub-circuit comprises: a fourth transistor, a fifth transistor, a sixth transistor, a seventh transistor, a storage capacitor and a drive transistor;

a control terminal of the fourth transistor is coupled with the light-emitting control signal terminal, a first terminal of the fourth transistor is coupled with the output node, and a second terminal of the fourth transistor is coupled with a control terminal of the fifth transistor;

a first terminal of the fifth transistor is coupled with a second terminal of the drive transistor, and a second terminal of the fifth transistor is coupled with the first terminal of the to-be-driven device;

a control terminal of the sixth transistor is coupled with the second scanning signal terminal, a first terminal of the sixth transistor is coupled with the reset signal terminal, and a second terminal of the sixth transistor is coupled with the second terminal of the drive transistor;

a control terminal of the seventh transistor is coupled with the second scanning signal terminal, a first terminal of the seventh transistor is coupled with the second data signal terminal, and a second terminal of the seventh transistor is coupled with a control terminal of the drive transistor;

a first terminal of the drive transistor is coupled with a second reference power terminal; and the second terminal of the to-be-driven device is coupled with the first reference power terminal.

14. A display apparatus, comprising a plurality of pixel circuits according to claim 1.

15. A driving method for a pixel circuit, wherein the driving method is used for driving the pixel circuit according to claim 1 and comprises:

loading a signal of an active level to a first scanning signal terminal in $2^N - 1$ first scanning signal terminals, loading a signal of an inactive level to other first scanning signal terminals in $2^N - 1$ first scanning signal terminals, and inputting a data signal loaded to a first data signal terminal into an input node of the corresponding first scanning signal terminal loaded with the active level;

controlling, by the control circuit, the signals of the $2^N$ control nodes respectively in response to the signals of the at least two input nodes in the $2^N-1$ input nodes;

providing, by the output circuit, the signal of the $m^{th}$ selection control signal terminal in the $2^N$ selection control signal terminals to the output node in response to the signal of the $m^{th}$ control node in the $2^N$ control nodes; and driving, by the light-emitting drive circuit, the to-be-driven device to work in response to the signal of the output node.

16. The driving method according to claim 15, wherein in the $2^N$ selection control signal terminals, respective voltage amplitudes of signals loaded to the respective selection control signal terminals are different.

17. The driving method according to claim 15, wherein in the $2^N$ selection control signal terminals, respective duty radios of the signals loaded to the respective selection control signal terminals are different.

18. The driving method according to claim 15, wherein the signal loaded to each selection control signal terminal of the $2^N$ selection control signal terminals is a direct current voltage signal or a pulse width modulation signal.

19. The driving method according to claim 16, wherein in the $2^N$ selection control signal terminals, respective duty radios of the signals loaded to the respective selection control signal terminals are different.

* * * * *